United States Patent
Yoo et al.

(10) Patent No.: US 11,871,732 B2
(45) Date of Patent: Jan. 16, 2024

(54) LIQUID DISPENSER FOR ANIMALS

(71) Applicant: LG ELECTRONICS INC., Seoul (KR)

(72) Inventors: Hyunsun Yoo, Seoul (KR); Jaehung Chun, Seoul (KR); Yousook Eun, Seoul (KR); Joogyeom Kim, Seoul (KR); Sungkyung Kim, Seoul (KR); Myongsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 188 days.

(21) Appl. No.: 16/571,074

(22) Filed: Sep. 14, 2019

(65) Prior Publication Data

US 2020/0084998 A1 Mar. 19, 2020

Related U.S. Application Data

(60) Provisional application No. 62/733,393, filed on Sep. 19, 2018.

(30) Foreign Application Priority Data

Oct. 31, 2018 (KR) .................. 10-2018-0131635
May 24, 2019 (KR) .................. 10-2019-0060918

(51) Int. Cl.
*A01K 7/02* (2006.01)
*A01K 7/06* (2006.01)
*A01K 7/00* (2006.01)

(52) U.S. Cl.
CPC .............. *A01K 7/005* (2013.01); *A01K 7/022* (2013.01); *A01K 7/06* (2013.01)

(58) Field of Classification Search
CPC . A01K 7/00; A01K 7/005; A01K 7/02; A01K 7/022; A01K 7/025; A01K 7/06

(Continued)

(56) References Cited

U.S. PATENT DOCUMENTS 1,218,969 A 3/1917 Ziener
1,243,126 A 10/1917 Ziener
(Continued)

FOREIGN PATENT DOCUMENTS

CA 2082083 5/1994
CA 2587229 5/2006
(Continued)

OTHER PUBLICATIONS

U.S. Appl. No. 16/574,219, filed Sep. 18, 2019.
(Continued)

*Primary Examiner* — David J Parsley
(74) *Attorney, Agent, or Firm* — KED & ASSOCIATES, LLP

(57) ABSTRACT

A pet water dispenser may be configured such that water may fall or may flow along a surface. The pet water dispenser may include a water tank, a pump, a water supply pipe connected to the pump, and a water supply hole communicating with the water supply pipe. A water supply plate having an upper surface over which water supplied from the water supply hole flows and a plate support supporting the water supply plate to be above the water tank. The plate support may be an inclined surface or a vertical surface. When a large amount of water is pumped from the pump, water may drop directly from an edge of the water supply plate through a water guide back into the water tank. When a small amount of water is pumped, water may flow along an outer circumferential surface of the plate support to the water guide.

18 Claims, 13 Drawing Sheets

(58) Field of Classification Search
USPC .................. 119/61.54, 61.55, 72, 74, 75
See application file for complete search history.

(56) References Cited

U.S. PATENT DOCUMENTS

| | | | |
|---|---|---|---|
| 1,512,629 | A | 10/1924 | Mueller et al. |
| 2,103,653 | A | 12/1937 | Weil |
| 2,510,446 | A | 6/1950 | Weil |
| 3,076,435 | A | 2/1963 | Seymour |
| 3,303,824 | A | 2/1967 | Anderson |
| 3,417,814 | A | 12/1968 | Oktay Sevgin |
| 3,441,003 | A | 4/1969 | Du Mond et al. |
| D221,755 | S | 9/1971 | Johnson |
| 3,691,787 | A | 9/1972 | Kaufmann |
| 4,100,885 | A | 7/1978 | Kapplinger |
| 4,133,456 | A | 1/1979 | Corini |
| 4,286,546 | A | 9/1981 | Moore |
| 4,561,384 | A | 12/1985 | Liff |
| 4,640,226 | A | 2/1987 | Liff |
| 4,932,561 | A | 6/1990 | Boxall |
| 5,031,689 | A | 7/1991 | Jones et al. |
| 5,105,771 | A | 4/1992 | Schafer |
| 5,140,134 | A | 8/1992 | Reusche et al. |
| 5,174,245 | A | 12/1992 | Bishop |
| 5,205,242 | A | 4/1993 | Kasselman |
| 5,209,069 | A | 5/1993 | Newnan |
| 5,345,063 | A | 9/1994 | Reusche et al. |
| 5,560,211 | A | 10/1996 | Parker |
| 5,601,199 | A | 2/1997 | Marty |
| 5,699,669 | A | 12/1997 | Gebhard |
| 5,782,094 | A | 7/1998 | Freeman |
| 5,791,287 | A | 8/1998 | Gruber |
| 5,799,609 | A | 9/1998 | Burns et al. |
| 5,845,605 | A | 12/1998 | Malamphy |
| 5,862,669 | A | 1/1999 | Davis |
| 5,884,582 | A | 3/1999 | Duckworth et al. |
| 5,941,077 | A | 8/1999 | Safyan |
| 6,003,318 | A | 12/1999 | Busick |
| 6,230,653 | B1 | 5/2001 | Tobin |
| 6,460,483 | B1* | 10/2002 | Northrop ............... A01K 7/00 119/702 |
| 6,622,657 | B2 | 9/2003 | Northrop et al. |
| 6,644,037 | B2 | 11/2003 | Busick |
| 6,705,540 | B2 | 3/2004 | Koshiyama et al. |
| 6,848,392 | B1 | 2/2005 | Kreutzer, Jr. |
| 7,089,881 | B2 | 8/2006 | Plante |
| 7,270,082 | B2* | 9/2007 | Plante ................... A01K 7/02 119/74 |
| 7,549,395 | B2* | 6/2009 | Stenberg ............... A01K 7/02 119/74 |
| 7,600,486 | B2 | 10/2009 | Ellis |
| 7,743,698 | B2 | 6/2010 | Muir et al. |
| 7,823,538 | B1 | 11/2010 | Merager |
| 7,958,844 | B1 | 6/2011 | Northrop |
| 8,117,991 | B1 | 2/2012 | Civitillo |
| 8,210,447 | B2 | 7/2012 | Cohen |
| 8,387,566 | B2 | 3/2013 | Graves et al. |
| 8,770,147 | B2 | 7/2014 | Rowe |
| 8,770,148 | B2 | 7/2014 | Lipscomb et al. |
| 9,035,222 | B2 | 5/2015 | Alexander |
| D738,579 | S | 9/2015 | Owens et al. |
| D755,449 | S | 5/2016 | Cornwell, Jr. et al. |
| 9,497,930 | B2* | 11/2016 | Lipscomb ............. A01K 7/02 |
| D819,898 | S | 6/2018 | Poisson et al. |
| 10,165,753 | B1 | 1/2019 | Huang |
| 11,154,034 | B2 | 10/2021 | Youn et al. |
| 11,160,250 | B2 | 11/2021 | Yoo et al. |
| 11,590,438 | B2* | 2/2023 | Yoo ..................... A01K 7/00 |
| 2002/0020673 | A1 | 2/2002 | Nohren et al. |
| 2003/0115902 | A1 | 6/2003 | Busick et al. |
| 2003/0140864 | A1 | 7/2003 | Wenstrand |
| 2003/0213437 | A1 | 11/2003 | Norris |
| 2005/0166853 | A1 | 8/2005 | Plante |
| 2006/0174838 | A1 | 8/2006 | Plante |
| 2006/0231040 | A1 | 10/2006 | Bast et al. |
| 2006/0283972 | A1 | 12/2006 | Muir et al. |
| 2006/0288947 | A1 | 12/2006 | Perlsweig et al. |
| 2007/0045159 | A1 | 3/2007 | Lee |
| 2007/0095297 | A1 | 5/2007 | Boyd |
| 2007/0199512 | A1 | 8/2007 | Ellis |
| 2007/0227456 | A1 | 10/2007 | Borey |
| 2008/0078330 | A1 | 4/2008 | McCallum et al. |
| 2008/0169249 | A1 | 7/2008 | Ter Stege |
| 2008/0190374 | A1* | 8/2008 | Farris ................... A01K 7/027 119/74 |
| 2008/0257272 | A1 | 10/2008 | Bolda |
| 2009/0078209 | A1* | 3/2009 | Kroeker ................ A01K 5/01 119/51.01 |
| 2009/0126641 | A1 | 5/2009 | Anderson et al. |
| 2009/0218985 | A1 | 9/2009 | Hallett |
| 2010/0095897 | A1 | 4/2010 | Rowe |
| 2010/0276508 | A1 | 11/2010 | Davies |
| 2010/0300366 | A1 | 12/2010 | Lipscomb et al. |
| 2011/0067638 | A1 | 3/2011 | Lipscomb et al. |
| 2011/0102945 | A1 | 5/2011 | Isono et al. |
| 2011/0214613 | A1 | 9/2011 | Diamond |
| 2011/0226470 | A1 | 9/2011 | Latrille et al. |
| 2011/0259273 | A1 | 10/2011 | Lipscomb et al. |
| 2012/0017839 | A1 | 1/2012 | Veness et al. |
| 2012/0111280 | A1 | 5/2012 | Shin et al. |
| 2012/0152866 | A1 | 6/2012 | Stiles, Jr. et al. |
| 2012/0216751 | A1 | 8/2012 | Rowe |
| 2013/0087102 | A1 | 4/2013 | Lipscomb et al. |
| 2013/0092090 | A1 | 4/2013 | McCallum |
| 2013/0175802 | A1 | 7/2013 | Breau et al. |
| 2013/0192529 | A1 | 8/2013 | Kruger et al. |
| 2013/0200064 | A1 | 8/2013 | Alexander |
| 2013/0228132 | A1 | 9/2013 | Lipscomb et al. |
| 2013/0255280 | A1 | 10/2013 | Murphy et al. |
| 2014/0033984 | A1 | 2/2014 | Li et al. |
| 2014/0053781 | A1 | 2/2014 | Lewis |
| 2014/0076242 | A1 | 3/2014 | Ho |
| 2014/0165607 | A1 | 6/2014 | Alexander |
| 2014/0251223 | A1 | 9/2014 | Rowe et al. |
| 2014/0353335 | A1 | 12/2014 | Van Diepen |
| 2015/0135728 | A1 | 5/2015 | Swanson et al. |
| 2015/0189862 | A1 | 7/2015 | Lipscomb |
| 2015/0196157 | A1 | 7/2015 | Swisth |
| 2015/0276204 | A1 | 10/2015 | Ray |
| 2015/0313180 | A1 | 11/2015 | Lipscomb et al. |
| 2015/0353335 | A1 | 12/2015 | Breault |
| 2016/0000037 | A1 | 1/2016 | Lipscomb et al. |
| 2016/0099599 | A1 | 4/2016 | Ho et al. |
| 2016/0113249 | A1 | 4/2016 | Kuo |
| 2016/0118179 | A1 | 4/2016 | Park et al. |
| 2016/0159633 | A1 | 6/2016 | Diffenderfer |
| 2016/0286757 | A1 | 10/2016 | Armstrong |
| 2016/0287363 | A1 | 10/2016 | Miller |
| 2017/0245465 | A1 | 8/2017 | Oates et al. |
| 2017/0255186 | A1 | 9/2017 | Ryznar et al. |
| 2018/0054073 | A1 | 2/2018 | Olson et al. |
| 2018/0160648 | A1 | 6/2018 | Goh |
| 2018/0177325 | A1 | 6/2018 | Lyons et al. |
| 2019/0075755 | A1 | 3/2019 | Imaizumi et al. |
| 2019/0140471 | A1 | 5/2019 | Johanski et al. |
| 2019/0162460 | A1 | 5/2019 | Oh |
| 2019/0227580 | A1 | 7/2019 | von der Assen et al. |
| 2019/0239476 | A1 | 8/2019 | Mai et al. |
| 2019/0239491 | A1 | 8/2019 | Yu et al. |
| 2019/0357747 | A1 | 11/2019 | Keiler, III |
| 2020/0303971 | A1 | 9/2020 | Hall et al. |
| 2020/0337266 | A1 | 10/2020 | Yu et al. |
| 2020/0355751 | A1 | 11/2020 | Swaans et al. |

FOREIGN PATENT DOCUMENTS

| | | |
|---|---|---|
| CH | 711714 | 1/2022 |
| CN | 2322412 | 6/1999 |
| CN | 2351955 | 12/1999 |
| CN | 1701206 | 11/2005 |
| CN | 2776044 | 5/2006 |
| CN | 1824622 | 8/2006 |
| CN | 1870903 | 11/2006 |
| CN | 200994393 | 12/2007 |

(56) References Cited

FOREIGN PATENT DOCUMENTS

| | | |
|---|---|---|
| CN | 200994394 | 12/2007 |
| CN | 201365463 | 12/2009 |
| CN | 201422313 | 3/2010 |
| CN | 201530253 | 7/2010 |
| CN | 101790970 | 8/2010 |
| CN | 201541568 | 8/2010 |
| CN | 101816289 | 9/2010 |
| CN | 101841191 | 9/2010 |
| CN | 102072468 | 5/2011 |
| CN | 102480927 | 5/2012 |
| CN | 102600661 | 7/2012 |
| CN | 202310894 | 7/2012 |
| CN | 102925877 | 2/2013 |
| CN | 102934044 | 2/2013 |
| CN | 202722224 | 2/2013 |
| CN | 202873523 | 4/2013 |
| CN | 203136752 | 8/2013 |
| CN | 203544552 | 4/2014 |
| CN | 203618522 | 6/2014 |
| CN | 103917147 | 7/2014 |
| CN | 103931515 | 7/2014 |
| CN | 203913286 | 11/2014 |
| CN | 204707695 | 10/2015 |
| CN | 204722018 | 10/2015 |
| CN | 105265331 | 1/2016 |
| CN | 205005702 | 2/2016 |
| CN | 105792644 | 7/2016 |
| CN | 205431490 | 8/2016 |
| CN | 105923696 | 9/2016 |
| CN | 205682161 | 11/2016 |
| CN | 106172064 | 12/2016 |
| CN | 106212310 | 12/2016 |
| CN | 205830734 | 12/2016 |
| CN | 106332801 | 1/2017 |
| CN | 205884322 | 1/2017 |
| CN | 106787233 | 5/2017 |
| CN | 206142936 | 5/2017 |
| CN | 206227319 | 6/2017 |
| CN | 106962218 | 7/2017 |
| CN | 206314381 | 7/2017 |
| CN | 107041318 | 8/2017 |
| CN | 107124043 | 9/2017 |
| CN | 107259458 | 10/2017 |
| CN | 107509653 | 12/2017 |
| CN | 206699096 | 12/2017 |
| CN | 206760412 | 12/2017 |
| CN | 206760441 | 12/2017 |
| CN | 107568092 | 1/2018 |
| CN | 206851699 | 1/2018 |
| CN | 107660756 | 2/2018 |
| CN | 206949206 | 2/2018 |
| CN | 107821202 | 3/2018 |
| CN | 107897027 | 4/2018 |
| CN | 207268238 | 4/2018 |
| CN | 107969351 | 5/2018 |
| CN | 207411173 | 5/2018 |
| CN | 207443927 | 6/2018 |
| CN | 207519400 | 6/2018 |
| CN | 108271728 | 7/2018 |
| CN | 108348966 | 7/2018 |
| CN | 108353810 | 8/2018 |
| CN | 108377928 | 8/2018 |
| CN | 108464253 | 8/2018 |
| CN | 207740217 | 8/2018 |
| CN | 207803161 | 9/2018 |
| CN | 207870035 | 9/2018 |
| CN | 109513315 | 3/2019 |
| CN | 109997713 | 7/2019 |
| DE | 20 2016 107 252 | 3/2018 |
| EP | 0 894 430 | 2/1999 |
| EP | 1 188 995 | 3/2002 |
| EP | 1 566 099 | 8/2005 |
| EP | 3 315 022 | 5/2018 |
| EP | 3 520 607 | 8/2019 |
| FR | 2 726 452 | 5/1996 |
| GB | 2 458 173 | 9/2009 |
| GB | 2572228 | 9/2019 |
| GB | 2574921 | 12/2019 |
| JP | H05-118725 | 5/1993 |
| JP | H07-269800 | 10/1995 |
| JP | 2012-188163 | 10/2012 |
| JP | 3200546 | 10/2015 |
| JP | 2017-148018 | 8/2017 |
| JP | 2018-057340 | 4/2018 |
| KR | 10-0835557 | 6/2008 |
| KR | 10-2010-0046615 | 5/2010 |
| KR | 10-1116332 | 3/2012 |
| KR | 10-2013-0136123 | 12/2013 |
| KR | 10-2014-0042949 | 4/2014 |
| KR | 20-0475039 | 11/2014 |
| KR | 10-2017-0003154 | 1/2017 |
| KR | 10-2017-0017718 | 2/2017 |
| KR | 10-1825334 | 2/2018 |
| KR | 10-1898661 | 9/2018 |
| RU | 2650560 | 4/2018 |
| TW | 201641007 | 12/2016 |
| TW | I 574614 | 3/2017 |
| WO | WO 2009/016604 | 2/2009 |
| WO | WO 2010/138799 | 12/2010 |
| WO | WO 2011/035320 | 3/2011 |
| WO | WO 2013/012943 | 1/2013 |
| WO | WO 2014/209159 | 12/2014 |
| WO | WO 2017/185053 | 10/2017 |

OTHER PUBLICATIONS

U.S. Appl. No. 16/574,240, filed Sep. 18, 2019.
U.S. Appl. No. 16/574,259, filed Sep. 18, 2019.
U.S. Appl. No. 16/574,237, filed Sep. 18, 2019.
U.S. Appl. No. 16/574,312, filed Sep. 18, 2019.
U.S. Appl. No. 16/574,349, filed Sep. 18, 2019.
U.S. Appl. No. 16/574,322, filed Sep. 18, 2019.
U.S. Appl. No. 16/574,368, filed Sep. 18, 2019.
U.S. Appl. No. 16/574,418, filed Sep. 18, 2019.
U.S. Appl. No. 16/574,474, filed Sep. 18, 2019.
U.S. Appl. No. 16/574,581, filed Sep. 18, 2019.
U.S. Appl. No. 16/571,245, filed Sep. 16, 2019.
U.S. Appl. No. 16/571,093, filed Sep. 14, 2019.
U.S. Appl. No. 16/571,090, filed Sep. 14, 2019.
U.S. Appl. No. 16/571,089, filed Sep. 14, 2019.
U.S. Appl. No. 16/571,076, filed Sep. 14, 2019.
U.S. Appl. No. 16/571,074, filed Sep. 14, 2019.
U.S. Appl. No. 16/571,075, filed Sep. 14, 2019.
U.S. Appl. No. 16/571,073, filed Sep. 14, 2019.
U.S. Appl. No. 16/570,310, filed Sep. 13, 2019.
U.S. Appl. No. 16/570,279, filed Sep. 13, 2019.
U.S. Appl. No. 16/569,827, filed Sep. 13, 2019.
U.S. Appl. No. 16/569,841, filed Sep. 13, 2019.
U.S. Appl. No. 16/569,908, filed Sep. 13, 2019.
United Stated Office Action dated Mar. 30, 2021 issued in co-pending related U.S. Appl. No. 16/571,090.
Chinese Office Action issued in Application No. 201910887007.2 dated Apr. 20, 2021.
Chinese Office Action issued in Application No. 201910886974.7 dated Apr. 20, 2021.
Chinese Office Action issued in Application No. 201910886711.6 dated Apr. 20, 2021.
Chinese Office Action issued in Application No. 201910889081.8 dated Apr. 20, 2021.
Chinese Office Action issued in Application No. 201910888688.4 dated Apr. 21, 2021.
Chinese Office Action issued in Application No. 201910886539.4 dated Apr. 22, 2021.
Chinese Office Action issued in Application No. 201910889318.2 dated Apr. 22, 2021.
Chinese Office Action issued in Application No. 201910888721.3 dated Apr. 22, 2021.
Chinese Office Action issued in Application No. 201910888102.4 dated Apr. 26, 2021.

(56) References Cited

OTHER PUBLICATIONS

European Search Report dated Apr. 17, 2020 issued in EP Application No. 19198180.2.
European Search Report dated Apr. 17, 2020 issued in EP Application No. 19198307.1.
European Search Report dated Apr. 20, 2020 issued in EP Application No. 19198310.5.
European Search Report dated Apr. 20, 2020 issued in EP Application No. 19198368.3.
European Search Report dated Feb. 24, 2020 issued in EP Application No. 19198289.1.
Chinese Office Action dated Mar. 31, 2021 issued in CN Application No. 201910886533.7.
European Search Report dated Feb. 3, 2020 issued in Application No. 19198173.7.
European Search Report dated Feb. 3, 2020 issued in Application No. 19198182.8.
European Search Report dated Feb. 3, 2020 issued in Application No. 19198183.6.
European Search Report dated Feb. 3, 2020 issued in Application No. 19198184.4.
European Search Report dated Feb. 3, 2020 issued in Application No. 19198186.9.
European Search Report dated Feb. 3, 2020 issued in Application No. 19198202.4.
European Search Report dated Feb. 10, 2020 issued in Application No. 19198265.1.
European Search Report dated Feb. 14, 2020 issued in Application No. 19198187.7.
European Search Report dated Feb. 14, 2020 issued in Application No. 19198196.8.
European Search Report dated Feb. 19, 2020 issued in Application No. 19198191.9.
European Search Report dated Feb. 19, 2020 issued in Application No. 19198200.8.
Chinese Office Action dated May 10, 2021 issued in CN Application No. 201910888718.1.
United States Office Action dated May 11, 2021 issued in co-pending related U.S. Appl. No. 16/571,093.
European Search Report dated Feb. 3, 2020 issued in EP Application No. 19198170.3.
European Search Report dated Feb. 27, 2020 issued in Application No. 19198292.5.
European Search Report dated Feb. 27, 2020 issued in Application No. 19198298.2.
European Search Report dated Apr. 9, 2020 issued in EP Application No. 19198174.5.
United States Office Action dated Jun. 2, 2020 issued in co-pending related U.S. Appl. No. 16/574,259.
United States Office Action dated Dec. 6, 2021 issued in co-pending related U.S. Appl. No. 16/569,827.
United States Office Action dated Dec. 10, 2021 issued in co-pending related U.S. Appl. No. 16/571,075.
United States Office Action dated Feb. 11, 2022 issued in co-pending related U.S. Appl. No. 16/574,322.
United States Office Action dated Feb. 1, 2022 issued in co-pending related U.S. Appl. No. 16/574,237.
Chinese Office Action dated Nov. 10, 2021 issued in CN Application No. 201910886533.7.
Chinese Office Action dated Nov. 10, 2021 issued in CN Application No. 201910886714.X.
Dong, CN108464253A Machine Translation Description, Aug. 31, 2018, obtained Jan. 13, 2022 (Year: 2018).
United States Office Action dated Mar. 14, 2022 issued in co-pending related U.S. Appl. No. 16/570,310.
United States Office Action dated Mar. 17, 2022 issued in co-pending related U.S. Appl. No. 16/574,581.
Chinese Notice of Allowance dated Apr. 8, 2022 issued in CN Application No. 201910888611.7.
United States Office Action dated May 19, 2022 issued in co-pending related U.S. Appl. No. 16/569,827.
United States Office Action dated Jun. 1, 2022 issued in co-pending related U.S. Appl. No. 16/571,075.
United States Office Action dated Jun. 2, 2022 issued in co-pending related U.S. Appl. No. 16/570,279.
United States Office Action dated Jun. 15, 2022 issued in co-pending related U.S. Appl. No. 16/569,908.
United States Office Action dated Mar. 24, 2022 issued in co-pending related U.S. Appl. No. 16/571,089.
United States Office Action dated Jun. 23, 2022 issued in co-pending related U.S. Appl. No. 16/574,368.
United Stated Office Action dated Jul. 5, 2022 issued in co-pending related U.S. Appl. No. 16/574,240.
United Stated Office Action dated Jul. 7, 2022 issued in co-pending related U.S. Appl. No. 16/574,474.
United Stated Office Action dated Jul. 29, 2022 issued in co-pending related U.S. Appl. No. 16/574,322.
United Stated Office Action dated Aug. 29, 2022 issued in co-pending related U.S. Appl. No. 16/571,245.
United States Office Action dated Sep. 19, 2022 issued in co-pending related U.S. Appl. No. 16/569,827.
Chinese Notice of Allowance dated Aug. 31, 2022 issued in CN Application No. 201910889318.2.
Chinese Office Action dated Sep. 21, 2022 issued in CN Application No. 201910888224.3.
United States Office Action dated Oct. 11, 2022 issued in co-pending related U.S. Appl. No. 16/570,279.
United States Office Action dated Oct. 13, 2022 issued in co-pending related U.S. Appl. No. 16/571,089.
Chinese Notice of Allowance dated Jul. 11, 2022 issued in CN Application No. 201910886305.X.
U.S. Office Action dated Apr. 27, 2023 issued in U.S. Appl. No. 16/574,581.
U.S. Office Action dated Mar. 30, 2023 issued in U.S. Appl. No. 16/574,368.
Rao et al. (2015). Effect of Corrugation Angle on Heat Transfer Studies of Viscous Fluids in Corrugated Plate Heat Exchangers. International Journal of Engineering and Technology Innovation, 5(2), pp. 99-107. (Year: 2015).
United States Office Action dated Feb. 23, 2023 issued in co-pending related U.S. Appl. No. 16/574,322.
United States Office Action dated Mar. 3, 2023 issued in co-pending related U.S. Appl. No. 16/574,474.
Chinese Office Action dated Feb. 13, 2023 issued in Application No. 202210573950.8.
U.S. Office Action dated Jun. 29, 2023 issued in U.S. Appl. No. 16/574,322.
Chinese Office Action dated Apr. 25, 2023 issued in Application No. 202210916091.8.
U.S. Office Action dated Jul. 19, 2023 issued in U.S. Appl. No. 16/574,474.
United States Office Action dated Apr. 27, 2021 issued in co-pending related U.S. Appl. No. 16/569,841.
United States Office Action dated Apr. 27, 2021 issued in co-pending related U.S. Appl. No. 16/574,418.
Chinese Office Action dated Mar. 30, 2021 issued in CN Application No. 201910886714.X.
Chinese Office Action dated Apr. 1, 2021 issued in CN Application No. 201910886305.X.
Chinese Office Action dated Apr. 9, 2021 issued in CN Application No. 201910886526.7.
Chinese Office Action issued in Application No. 201910888224.3 dated Apr. 12, 2021.
Chinese Office Action issued in Application No. 201910888611.7 dated Apr. 12, 2021.
Chinese Office Action issued in Application No. 201910888695.4 dated Apr. 16, 2021.
European Search Report dated Apr. 23, 2020 issued in EP Application No. 19198303.0.
Chinese Office Action dated May 17, 2021 issued in CN Application No. 201910887029.9.

(56) References Cited

OTHER PUBLICATIONS

Chinese Office Action dated May 17, 2021 issued in CN Application No. 201910889360.4.
Chinese Office Action dated May 18, 2021 issued in CN Application No. 201910888671.9.
Chinese Office Action dated May 21, 2021 issued in CN Application No. 201910888661.5.
Chinese Office Action dated May 17, 2021 issued in CN Application No. 201910889361.9.

* cited by examiner

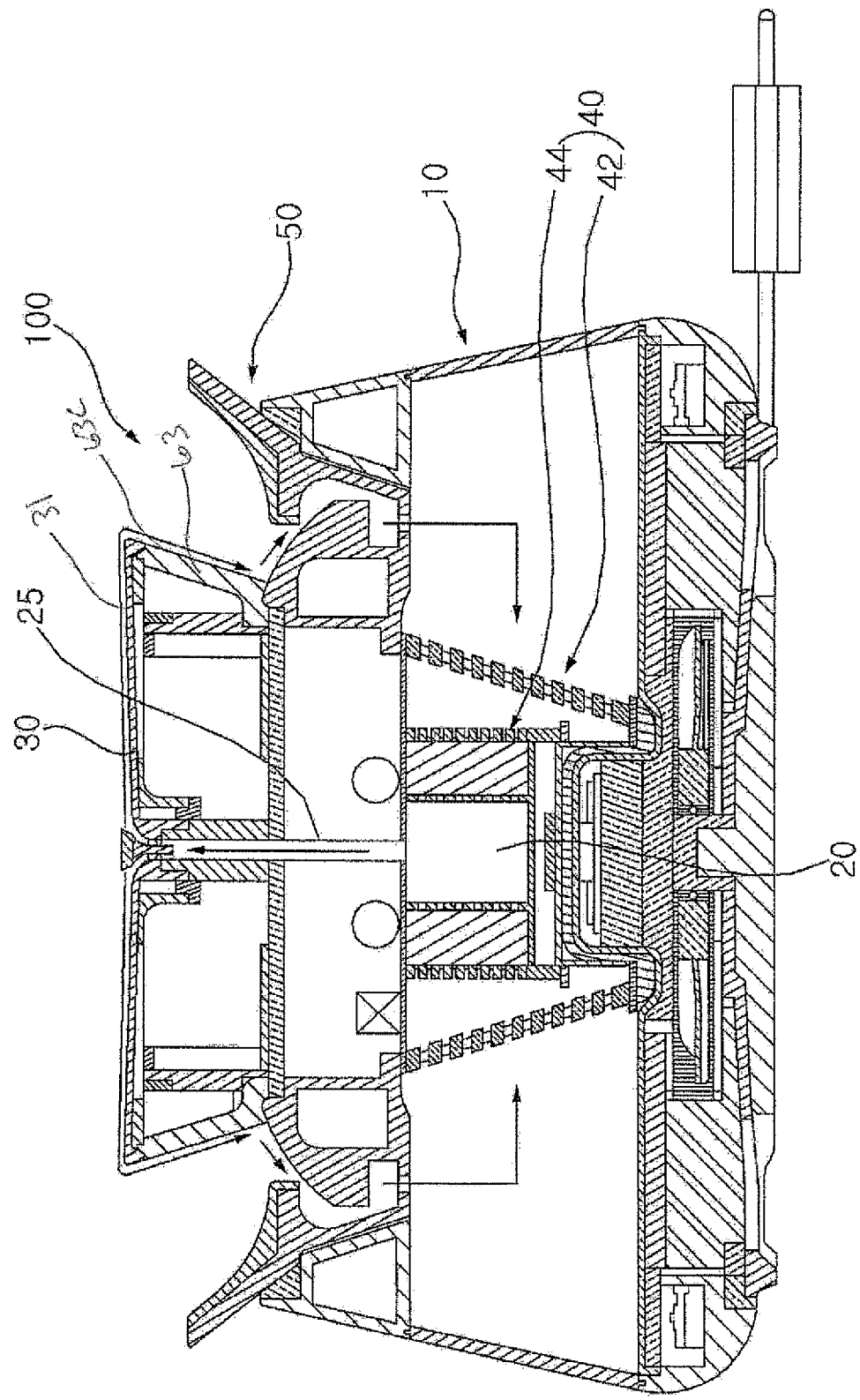

LIQUID DISPENSER FOR ANIMALS

CROSS-REFERENCE TO RELATED APPLICATION(S)

This application claims priority under 35 U.S.C. § 119 to U.S. Provisional Application No. 62/733,393 filed on Sep. 19, 2018, and Korean Application No. 10-2019-0060918 filed on May 24, 2019, and 10-2018-0131635 filed on Oct. 31, 2018, whose entire disclosure(s) is/are hereby incorporated by reference.

BACKGROUND

1. Field

A liquid dispenser to supply liquid to an animal, e.g., a pet, is disclosed herein.

2. Background

In recent years, the population of people raising a pet has increased, in addition to attachment and interest in pets. Like most animals, pets must drink water to survive and maintain a biorhythm. Since pets are often left alone and since communication with their owners is difficult, the demand for pet water dispensers or water supply devices has increased.

European Patent No. 3315022 A1 and US Publication No. 2014/053781 disclose drinking bowls for pets. However, such drinking bowls have various disadvantages, which the present disclosure solves.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 4A is a view showing a flow of water when a pumping capacity of a pump is controlled to be small;

DETAILED DESCRIPTION

Figure 1:
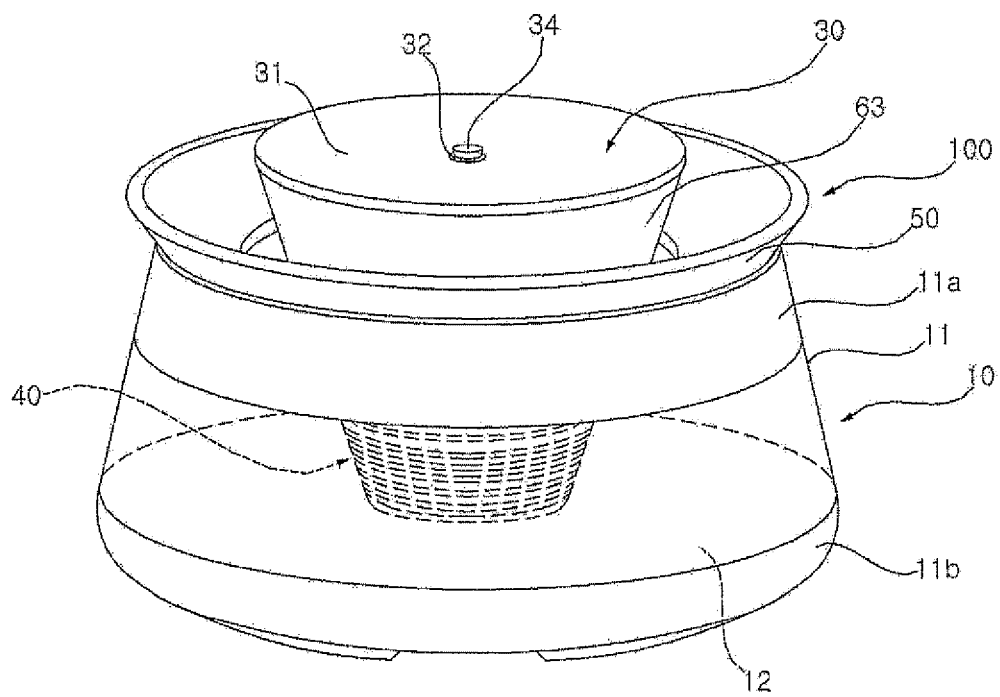
FIG. 1 is a perspective view showing a pet water dispenser according to an embodiment.
Figure 2:
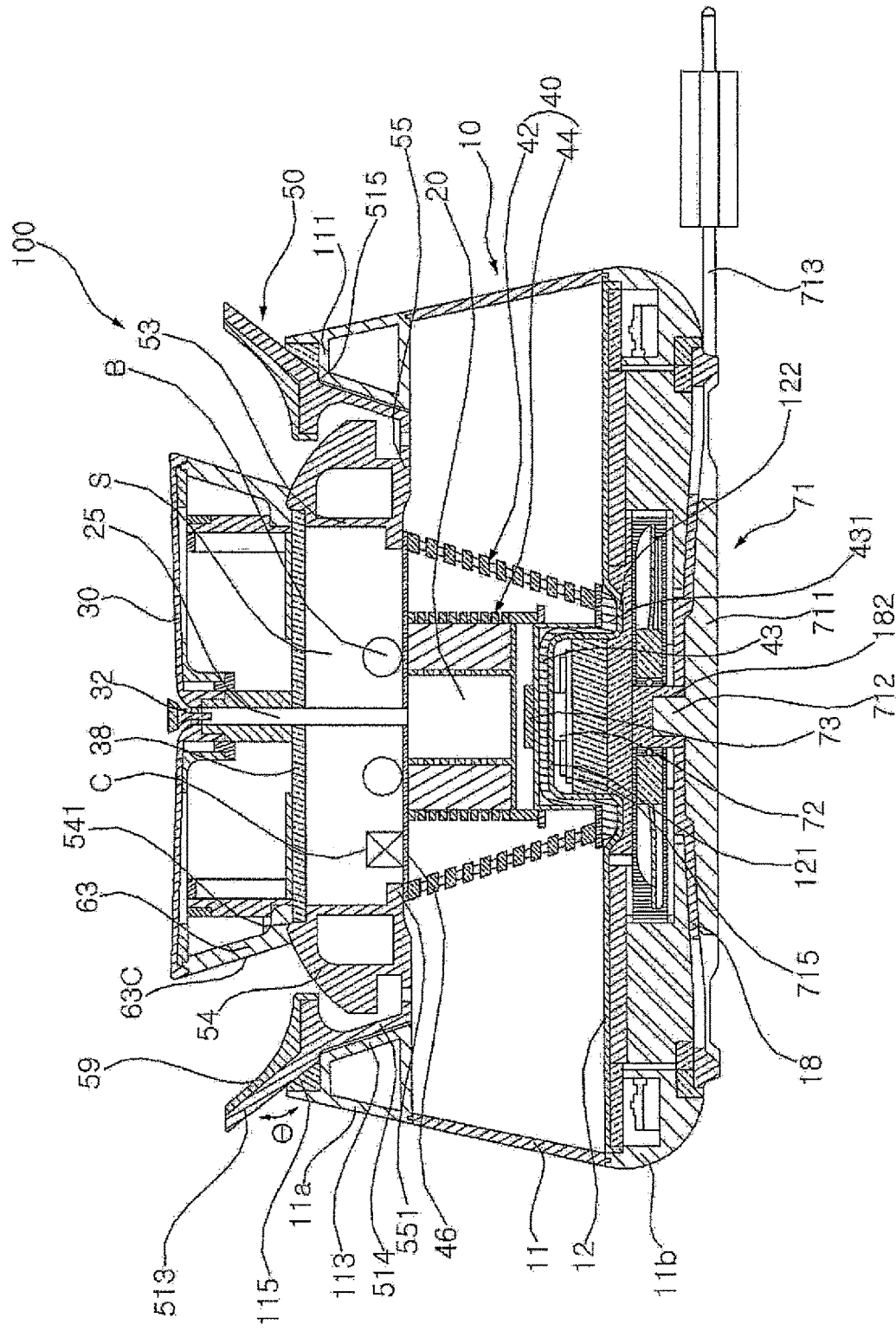
FIG. 2 is a side sectional view of the pet water dispenser shown in FIG. 1.
Figure 3:
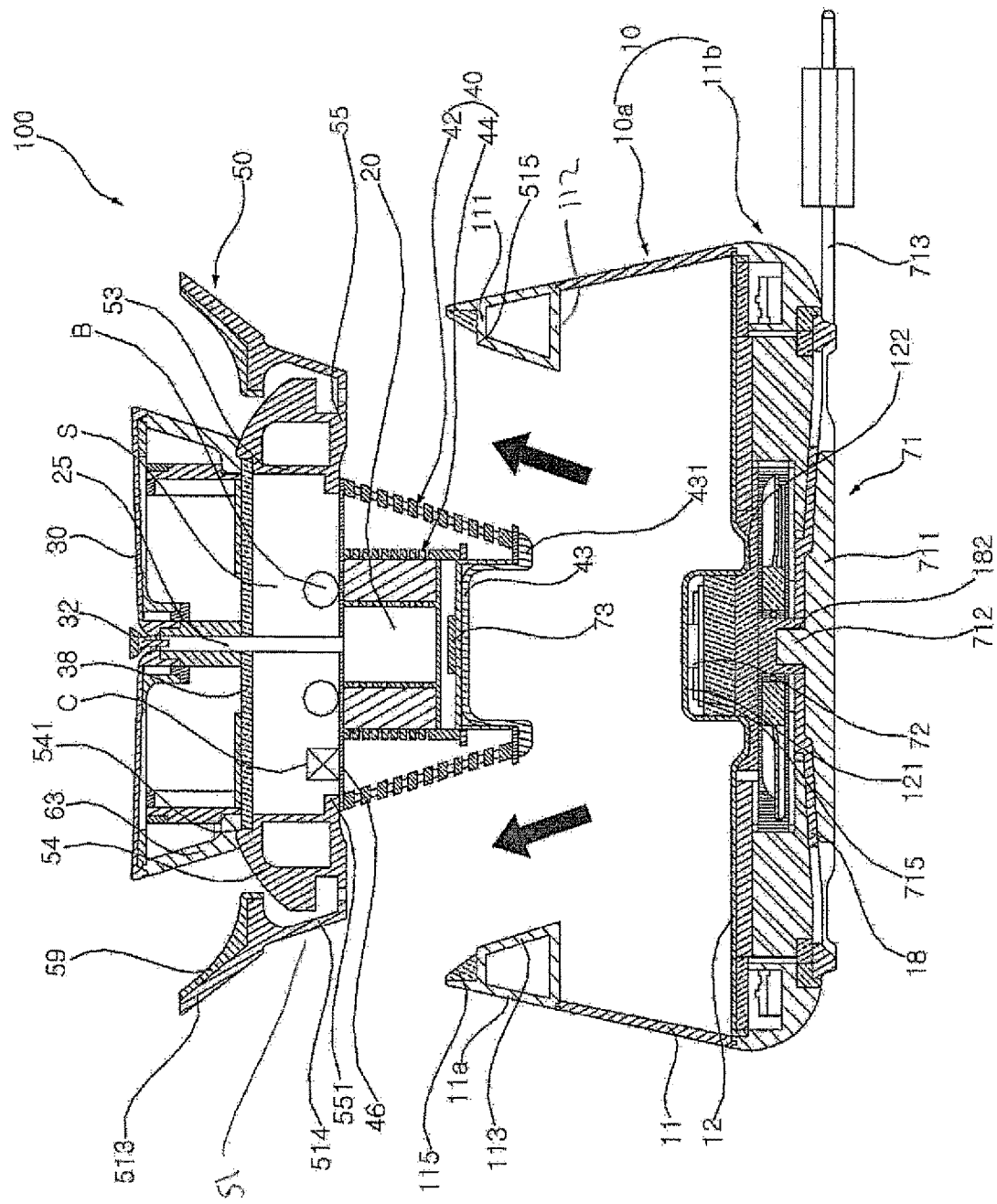
FIG. 3 is a view showing a state in which an inner is separated from a water tank.

Referring to FIGS. 1 to 3, a pet water dispenser may include a water tank or storage chamber 10 having an opened upper side or top and an inner assembly 100 covering the opened upper side of the water tank 10. The inner assembly 100 may have an upper surface or plate body 31 and a support 63 that projects light upward to the upper surface 31. The support 63 may serve as a light diffuser and may also be referred to as a light guide or light guide plate. An upper end or edge of an outer circumferential surface of the support 63 may be provided at an edge of an outer circumferential surface of the upper surface or plate 31. The outer circumferential surface of the support 63 may be formed as an inclined surface 63C tilted inward from top to bottom. Thus, the support 63 may have a radius that recedes from top to bottom.

An upper portion of the inner assembly 100 may protrude above the water tank 10 while a lower portion of the inner assembly 100 may be inserted into the water tank 10. A pump 20 to feed water from the water tank 10 to the upper surface 31 may be provided below the inner assembly 100.

Figure 4B:
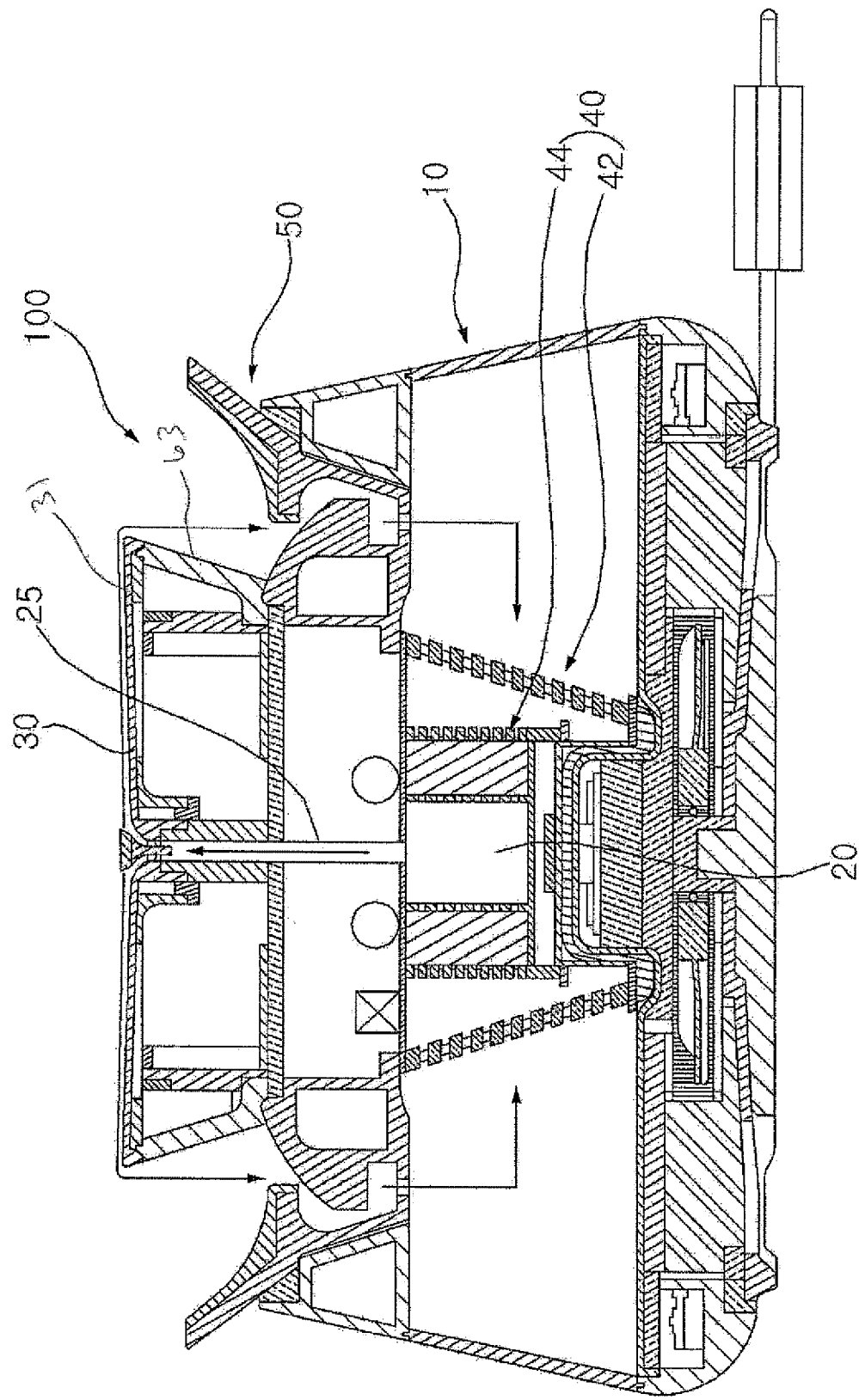
FIG. 4B is a view showing a flow of water when the pumping capacity of the pump is controlled to be large.

The water pumped to the upper surface 31 can fall down off the edge of the upper surface 31 if a pumping capacity or pumping rate of the pump 20 is high (see arrows of FIG. 4B). If the pumping capacity of the pump 20 is low, water can flow downward on an outer circumferential surface of the support 63 (see arrows of FIG. 4A). Not only may a pet drink water falling off the upper surface 31, a pet may drink water on top of the upper surface 31.

The pet water dispenser may be formed of the water tank 10 and the inner assembly 100, which are detachably coupled to each other so that a user may easily lift off and insert the inner assembly 100. The user may easily exchange or replace water stored in the water tank 10 or easily wash the water tank 10 after detaching the inner assembly 100 from the water tank 10.

The inner assembly 100 may include a pump 20, a water supply pipe or pipe 25, a water supply plate or top plate 30, and a water guide or a water receiver 50. The water receiver 50 may also be referred to as a splash guard or drip tray. The pump 20, the water supply pipe 25, the water supply plate 30, and the water guide 50 may be combined to form a single inner assembly 100.

The pump 20 may be provided at a center of the water tank 10. The water supply pipe 25 may transfer water discharged from the pump 20 to the water supply plate 30. The water supply pipe 25 may be arranged in a vertical direction of the water tank 10.

The water supply plate 30 may be provided above a center of the water tank 10. The water supply plate 30 may have the upper surface 31 through which the water supplied from the water supply pipe 25 flows. The upper surface 31 of the water supply plate 30 may form the upper surface 31 of the inner assembly 100.

A water supply hole 32 may be formed at a center of the water supply plate 30 to supply water discharged from the water supply pipe 25 to the upper surface 31. The water supply hole 32 may therefore communicate with an upper end of the water supply pipe 25. Water that has been introduced to the upper surface 31 through the water supply hole 32 may eventually flow down to a water guide 50, either after falling off an edge of the water supply plate 30 or by flowing along an outer peripheral surface of the support 63 before reaching the water guide 50.

An edge of the water supply plate 30 may be formed as a convex surface curved toward an outside of the water supply plate 30. Therefore, water that has remained on an upper surface 31 of the water supply plate 30 can easily flow down on an outer peripheral surface of the support 63 after falling off the edge of the water supply plate 30.

Alternatively or in addition thereto, the water guide 50 may at least partially cover an opened upper side of the water tank 10. The water guide 50 may be provided below the water supply plate 30. The water guide 50 may receive water from the water supply plate 30 or the support 63 and guide the water into the water tank 10. Thus, water stored in the water tank 10 may be pumped to the upper surface 31 of the water supply plate 30 via the pump 20 and the water supply pipe 25. Then, water may flow from the upper surface 31 back to the water tank 10 via the water guide 50.

The inner assembly 100 may further include an optional filter or filter assembly 40 to filter the water stored in the water tank 10. The pump 20, the water supply pipe 25, the water supply plate 30, the water guide 50 and the filter assembly 40 may be integrally combined to form a single inner assembly 100. If the inner assembly 100 further comprises a filter 40, the pump 20 may pump the filtered water of the filter assembly 40.

The filter assembly 40 may include a first or outer filter 42 and a second or inner filter 44 provided within the first filter 42. In addition, the inner assembly 100 may further include at least one optional UV (Ultraviolet Ray) filter or light 47, 48, and/or 49 to sterilize water. The UV filter 47, 48, and/or 49 may comprise a UV LED (Ultraviolet Light-Emitting Diode) and emit UV radiation.

A UV filter or light 47 and/or 48 (FIG. 7) may be provided with the first and/or second filter 42 and 44 to sterilize water stored in the water tank 10. A UV filter or light 49 (FIG. 8) may be provided with the water supply pipe 25 and/or the water supply plate 30 to sterilize water discharged from the water supply pipe 25.

Referring to FIG. 3, the water tank 10 may include a container 10a opened on an upper side and storing water therein provided above a container support 11b. The container support 11b may separate the container 10a from a floor or ground surface. The container support 11b may also be referred to as a lower rim or edge wall The container 10a may include tubular sidewalls or walls 11 and 11a opened on an upper side, and a bottom plate 12 provided below walls 11 and 11a. Water can be stored in an inner space formed by the walls 11 and 11a and the bottom plate 12. The walls 11 and 11a may be formed in a cylindrical or conical shape where a radius of the walls 11 and 11a may recede in an upward direction.

The walls 11 may be a main or middle wall and the wall 11a may be an upper wall positioned above the main wall 11. The main wall 11 may be formed of a transparent material (e.g., glass or plastic), and the upper wall 11a may be formed of an opaque material (e.g., stainless steel or pigmented plastic). The main wall 11 may be a portion of the container 10a where water is substantially stored. The user may visually check an amount of water and a possible contamination level via the transparent main wall 11.

An upper end of the container support 11b may be positioned below the main wall 11. The container support 11b may be curved such that a lower end of the container support 11b may closer to a center than the upper end of the container support 11b. An outer peripheral surface 116 (FIG. 5) between the upper end of the container support 11b and the lower end of the container support 11b may be formed outwardly convex.

The container support 11b may be formed of an opaque material. The main wall 11, the upper wall 11a, and the container support 11b may be formed of different materials that are later bonded or welded together for integration. Alternatively, the main wall 11, the upper wall 11a, and the container support 11b may be made of the same material and integrally manufactured.

As an example, the main wall 11 may be formed of a different material from the upper wall 11a and the container support 11b, and the upper wall 11a and the container support 11b may be formed of the same material. The upper wall 11a and the container support 11b may be made of a material having an enhanced aestheticism (e.g., stainless steel or plastic). The main wall 11 may be made of a transparent material (e.g., glass or plastic) so that an amount of water in the water tank 10 may be easily determined.

The main wall 11 may be provided on an upper side of the bottom plate 12. A lower side of the bottom plate may be provided on the container support 11b. The main wall 11 may therefore form a side edge or wall of the water tank 10.

A lower portion of the water guide 50 may be inserted into the water tank 10, and an upper portion of the water guide 50 may protrude outward and upward from the water tank 10. An outer surface of the water guide 50 may be formed with an inner or lower guide surface 514 supported by an inner tank wall 113. The inner guide surface 514 may be inclined, and the inner tank wall 113 may be inclined to correspond to an inclination of the inner guide surface 514. The inner guide surface 514 may also be referred to as an outer inclined surface 514 because it forms an outer surface of the water guide. Details of an attachment of the water guide 50 and the water tank 10 will be described later.

The pump 20 and the filter assembly 40 may be provided below the water guide 50 and inserted into the water tank 10. The filter assembly 40 may be connected to a lower side of an inner guide wall 53 of the water guide 50.

The inner assembly 100 may further include a partition plate 38. The partition plate 38 may be spaced apart from and provided below the water supply plate 30. The partition plate 38 may be penetrated by the water supply pipe 25. The partition plate 38 may be inserted into a groove or stepped portion 541 formed on an upper side of the inner guide wall 53 or at an inner side of a guide 54 coupled to the inner guide wall 53. The partition plate 38 may be inserted into the groove 541 of the inner guide wall 53 of the water guide 50 to cover an opened upper side of the inner guide wall 53. The partition plate 38 may partition a chamber or sealed space S and a space housing at least one light emitting device 61 to be described later.

The support 63 may extend between the water supply plate 30 and the water guide 50, and may also extend between the water supply plate 30 and the partition plate 38. A lower portion of the support 63 may couple to the guide 54 of the water guide 50 and/or the partition plate 38. The support 63 may primarily support the water supply plate 30.

The support 63 may be formed in a cylindrical shape. The at least one light emitting device 61 may be provided inside the support 63. The light emitting device (LED) 61 may be a light emitting diode (FIG. 9) that emits light of any wavelength that may be visible to a pet or human. The support 63 may be made of a certain material that diffuses light from the LED 61 so that light emitted from the LED 61 is visible from an outside of the water tank 10. An upper end of an outer peripheral surface of the support 63 may be positioned below an edge of the water supply plate 30.

A radius of the support 63 at the upper end of the outer peripheral surface may be the same as or similar to a radius of the water supply plate 30. A radius of the support 63 may recede from an upper side to a lower side. The outer circumferential surface of the support 63 may therefore be formed as an inclined surface 63C having a lower side positioned closer to the center than an upper side.

The support 63 may have a hollow interior. The water supply plate 30 can cover an opened upper side of the support 63, and the partition plate 38 may cover an opened lower side of the support 63. The water supply plate 30 and the support 63 may be provided above the inner side guide 53 of the water guide 50.

The pump 20 may be provided in the water tank 10 to pump the water stored in the water tank 10 to the water supply plate 30. The pump 20 may be spaced upward from the bottom plate 12 of the water tank 10 when the inner assembly 100 is coupled to the water tank 10. The water supplied from the water supply pipe 25 may float or spill onto the upper surface 31, and may flow over the edge of the water supply plate 30. The water guide 50 may be provided between the water tank 10 and the water supply plate 30 to catch the falling water.

The filter assembly 40 may be provided inside the water tank 10 at a center of the water tank 10. The filter assembly 40 may filter foreign substances contained in the water stored in the water tank 10 before flowing into the pump 20.

The pet water dispenser may further include a power supply device or assembly, an illumination assembly 60, a water level sensor 86, a water temperature sensor 85, a proximity sensor, a pollution or contamination level sensor, and a water temperature maintenance device or assembly.

Referring to FIG. 4A, when a small amount of water is supplied to the upper surface 31 of the water supply plate 30, the water introduced to the water supply plate 30 may flow relatively slowly, and may spill downward from an edge of the water supply plate 30 along the inclined surface 63C of the support 63 before reaching the water guide 50. Referring to FIG. 4B, when a large amount of water is supplied to the upper surface 31 of the water supply plate 30 and flows relatively fast, the water flowing past an edge of the water supply plate 30 may fall directly onto the water guide 50 without flowing along the support 63.

The pump 20 may have a variable pumping capacity. The pump 20 may reduce the pumping capacity so that a smaller amount of water is supplied to the upper surface 31 of the water supply plate 30, and the pump 20 may increase the pumping capacity so that a larger amount of water is supplied to the upper surface 31 of the water supply plate 30.

Depending on the species, pets may prefer to drink water flowing on surfaces, such as on an upper surface 31 of the water supply plate 30, or may prefer to drink water falling off the edge of the water supply plate 30. The user may therefore adjust the pumping capacity of the pump 20 according to the species of his pet to control the water to either flow along the inclined surface 63C of the support 63 or to fall directly onto the water receiver 50. The user may also adjust the pumping capacity of the pump 20 to supply more or less water to his pets.

Referring to FIG. 4A, a capacity of water pumped per second by the pump 20 may be less than ⅓ of a capacity of water that the top surface 31 of the water supply plate 30 can accommodate. To create the flow of water exemplified in FIG. 4B, the capacity of water pumped per second by the pump 20 may be set to ⅓ of the capacity of the water that the upper surface 31 can accommodate. For example, if the upper surface 31 of the water supply plate 30 can accommodate 150 ml of water, the pump 20 may pump water at 50 ml or less per second to create the flow of FIG. 4A or pump more than 50 ml of water per second to create the flow of FIG. 4B.

When the flow of water as shown in FIG. 4B is implemented, water falling on the water guide 50 may generate a noise. The noise may interfere with a sleep of the user at night. The control unit or controller C may therefore control the pumping capacity of the pump 20 to be less at night to implement the flow of water as shown in FIG. 4A, which is quieter.

Figure 5:
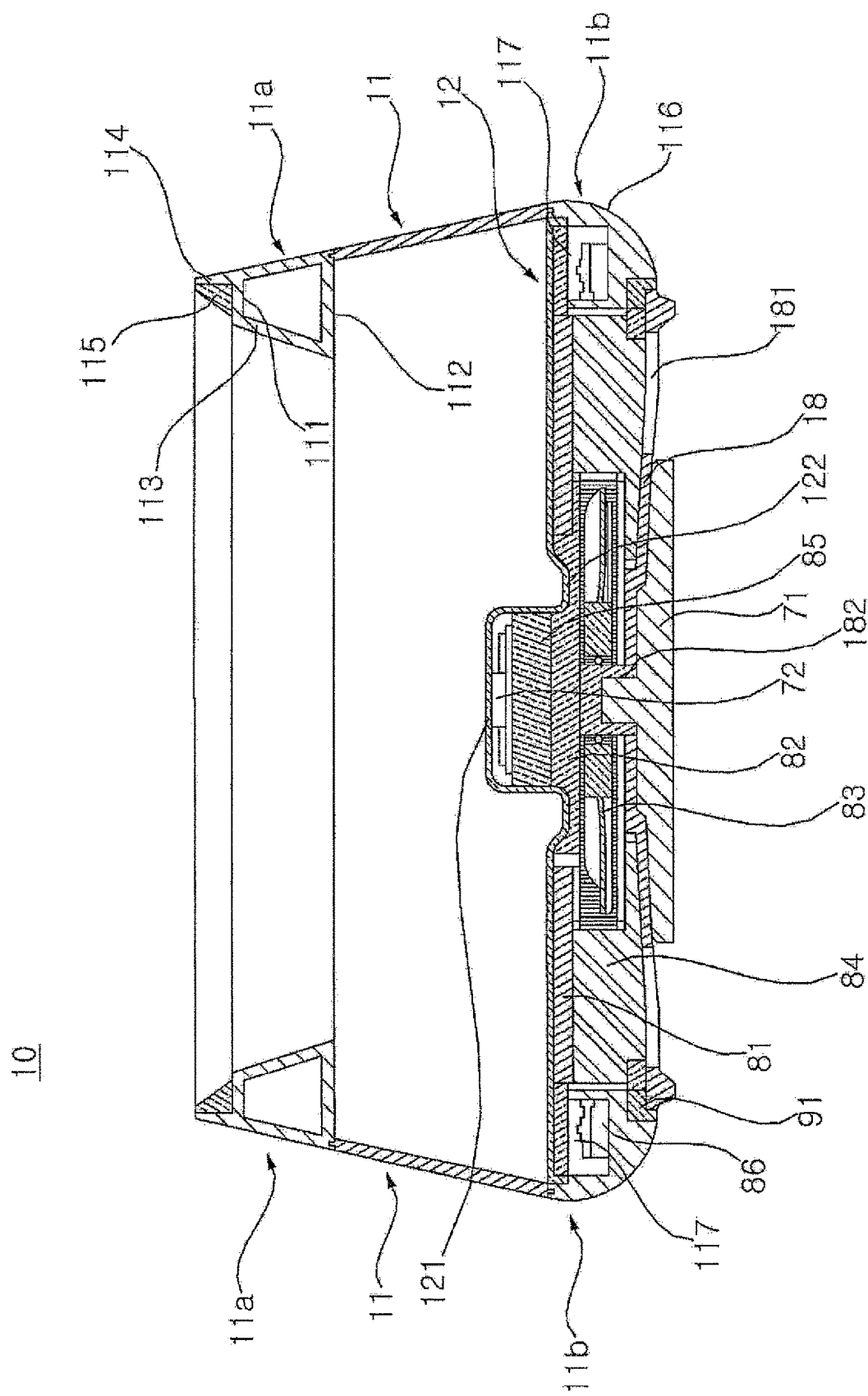
FIG. 5 is a side sectional view showing the water tank shown in FIG. 2.

Referring to FIGS. 1, 2, and 5, the water tank 10 may be formed in a cylindrical or truncated cone shape having a smaller diameter toward an upper side of the water tank 10. However, a shape is not limited thereto and may be formed in other shapes.

When the water tank 10 is formed as a truncated cone having a decreasing diameter in an upward direction, the water tank 10 may be able to withstand external impacts of a considerable force. When the pet is drinking water in the pet water dispenser, even if the pet impacts the water tank 10, the water tank 10 may not be overturned.

The upper wall 11a may extend upward from the main wall 11 and may further include protruding walls or plates 111 and 112 and the inner tank wall 113. The protruding plates 111 and 112 may be formed on an inner surface of the upper wall 11a to protrude toward the center of the water tank 10. The protruding plates 111 and 112 may also be referred to as projecting plates 111 and 112.

The inner tank wall 113 may extend between the protruding plates 111 and 112. Since the inner tank wall 113 may be inclined, the protruding plates 111 and 112 may have different lengths.

The protruding plates 111 and 112 may be a first protrusion 111 and a second protrusion 112 protruding horizontally toward the center of the water tank 10. The first protruding plate 111 and the second protruding plate 112 may be spaced apart from each other in a vertical direction. The first protruding plate 111 may be provided above the second protruding plate 112.

The protruding plates 111 and 112 and the inner tank wall 113 may have voids or openings formed therein to reduce an amount of material used and a weight. When the upper side wall 11a is formed of an expensive material to improve aestheticism, voids may be formed in the protruding plates 111 and 112 and the inner tank wall 113 to reduce the cost of the upper side wall 11a.

The second protruding plate 112 may be longer than the first protruding plate 111 so as to protrude further inward than the first protruding plate 111. The inner tank wall 113 may extend between the first and second protruding plates 111 and 112, so lengths of the first and second protruding plates 111 and 112 may be configured so that the inner tank wall 113 has an inclination similar to an inclination of the inner or lower guide surface 514.

The upper wall 11a may extend upward from the main sidewall 11 to protrude upward from the main wall 11. An inclination of an outer surface of the upper wall 11a may match an inclination of an outer surface of the main wall 11 so as to appear seamless.

The upper wall 11a may extend upward from the main wall 11 so as to be wider or narrower in the radial direction than the main wall 11. Therefore, in an alternative configuration, the upper wall 11a may not have a similar inclination as that of the main wall 1.

The upper wall 11a may include an extension or flange 114 protruding upward from the first protruding plate 111. A bumper 115 may be attached to an inner surface of the extension 114 and an upper surface of the first protruding plate 111. The bumper 115 may be made from a packing or cushioning, or may be made from rubber. The water guide 50 may be placed on the upper wall 11a so as to be in close contact with the bumper 115. The bumper 115 may also be formed to be in close contact with an outer guide wall 51 of the water guide 50.

A protrusion or hollow protrusion 121 may be formed to be convex upward at a center of the bottom plate 12. A first wireless power transfer device 72 (e.g., a wireless power transmitter and/or transceiver) may be installed in an inner space of the protrusion 121 under the bottom plate 12. The first power transfer device 72 may work with a second power transfer device 73 (e.g., a wireless power receiver and/or transceiver) to be described later.

The bottom plate 12 may be formed integrally with the main wall 11. Alternatively, the bottom plate 12 may be formed separately from the main wall 11 and later coupled with the main wall 11. The bottom plate 12 may be formed with a ring-shaped groove or recess 122 recessed downward around the protrusion 121. The bottom plate 12 may be made of a material having high thermal conductivity, e.g., metal.

The outer peripheral surface 116 of the container support 11b may be a convex curved surface extending downward from a lower end or edge of the main wall 11. Therefore, when an external impact is applied to the water tank 10 to tilt the water tank 10 to one side, the outer peripheral surface 116 may roll on the ground or floor surface and allow the water tank 10 to roll back to its original orientation. Thus, the outer peripheral surface 116 may prevent the water tank 10 from easily spilling by providing a bit of give.

A lower end of the outer circumferential surface 116 may be provided closer to the center of the water tank 10 than an upper end of the outer circumferential surface 116. The curvature of the outer circumferential surface 116 may allow lifting of the water tank 10 by the user without needing to wedge or insert fingers between the outer circumferential surface 116 and a floor or ground surface. The user may place fingers in a space under a curved corner of the outer circumferential surface 116 and the floor to easily lift and balance the pet water dispenser.

Further, a mounting portion 117 having a predetermined width in the direction of the center of the water tank 10 may protrude from an inner surface of the outer circumferential surface 116. A mounting space may be formed by a recess in an upper surface of the mounting portion 117 between the outer circumferential surface 116 and an inner circumferential surface of the mounting portion 117, and the mounting space may have a predetermined area overlapping an edge of the bottom plate 12. A water level sensor 86 may be installed in the mounting space of the mounting portion 117.

The water level sensor 86 may be a strain gauge or load sensor that senses a weight of the water stored in the water tank 10 and applied to the bottom plate 12. The controller C may determine a water level in the water tank 10 based on a weight of the water in the water tank 10 sensed by the water level sensor 86.

Further, the container support 11b may be formed to be hollow or so that upper and lower (or top and bottom) ends thereof are open. The bottom plate 12 may cover the opened upper end of the container support 11b, while a base plate 18 may cover the opened lower end of the container support 11b. Various components described later may be installed in an inner space of the container support 11b between the base plate 18 and the bottom plate 12.

The base plate 18 may be spaced downward from and provided below the bottom plate 12. The base plate 18 may be placed on a docking station 71 and may be formed to have a circular shape. Ventilation holes or openings 181 may be formed in the base plate 18. A plurality of ventilation holes 181 may be radially arranged along a circumferential direction of the base plate 18.

The container support 11b may be provided with an inner space having upper and lower openings closed by the bottom plate 12 and the base plate 18, respectively. The container support 11b may be formed as an annular wall or in a ring shape. The inner space of the container support 11b may have a height that corresponds to a height of the mounting portion 117, and thus may be a space located on an inner side of the mounting portion 117.

A thermoelectric element or heater 81 may further cover an opened upper side of the inner space of the container support 11b. The thermoelectric element 81 may be a Peltier device or a thermoelectric cooler (TEC). Thus, the inner space of the container support 11b may be defined as a space between the thermoelectric element 81, the base plate 18, and the mounting portion 117 of the container support 11b.

The upper surface of the mounting portion 117 may be located below the upper end of the container support 11b, and a lower surface of the mounting portion 117 may be positioned above the lower end of the container support 11b. The bottom plate 12 may be provided on an upper surface of the thermoelectric element 81, an outer edge of the bottom plate 12 may be provided on the upper surface of the mounting portion 117. A ring-shaped light emitting device or warning light 91 may be provided on a lower surface of the mounting portion 117, and the base plate 18 may be provided below the warning light 91.

The thermoelectric element 81 may be provided between the bottom plate 12 and the base plate 18. The thermoelectric element 81 may heat or cool the bottom plate 12, thereby heating or cooling the water stored in the water tank 10. The thermoelectric element 81 may therefore maintain a temperature of water stored in the water tank 10 at a predetermined temperature.

A heat sink 84 may be provided in the inner space of the container support 11b. Further, a heat-dissipating fan or fan 83 may be provided in the inner space of the container support 11b. A motor 82 to rotate the fan 83 may be installed between the bottom plate 12 and the base plate 18.

The heat sink 84 may include a plurality of radiating fins that protrude vertically from a heat dissipation or diffusing plate. Upper surfaces of the plurality of radiating fins may contact a lower surface of the thermoelectric element 81 so that heat generated in the thermoelectric element 81 may be exchanged with ambient air passing through the plurality of radiating fins. Alternatively, the heat dissipation plate may contact the lower surface of the thermoelectric element 81.

The heat sink 84 may have a circular shape. Accordingly, the plurality of radiating fins may be arranged along a circumferential direction of the heat sink 84 so that an overall shape of the heat sink 84 may be annular.

The fan 83 may be provided inside the plurality of radiating fins so that the plurality of radiating fins may surround the fan 83. The fan 83 may suction air in a direction of a rotation axis of the motor 82 and then discharge the air in a direction perpendicular to the rotation axis. Since a rotation shaft of the motor 82 may be arranged vertically, the fan 83 may suction the air flowing through the ventilation hole 181 of the base plate 18 from a downward direction and discharge the air toward the plurality of radiating fins.

The heat sink 84 may be provided with a hole at a position corresponding to a position of the ventilation hole 181 to guide the air passing through the ventilation hole 181 to the fan 83. A hollow portion may be formed at a center of the thermoelectric element 81, and the motor 82 may be installed or provided in the hollow portion. The fan 83 may be provided below the motor 82.

A water temperature sensor or thermometer 85 may further be provided between the bottom plate 12 and the base plate 18. The water temperature sensor 85 may sense the temperature of the water stored in the water tank 10.

The water temperature sensor 85 may be installed or located in a space inside the protrusion 121 of the bottom plate 12. Alternatively or in addition thereto, the water temperature sensor 85 may partially protrude through the bottom plate 12 into the container of the water tank 10. When the temperature of the water in the water tank 10 sensed by the water temperature sensor 85 is not within a predetermined range, the thermoelectric element 81 may be activated to cool or heat the water, and heat of the thermoelectric element 81 may be transmitted through the heat sink 84 and discharged via the plurality of ventilation openings 181.

When the temperature of the thermoelectric element 81 is higher than a predetermined temperature or when the temperature of the heat sink 84 is higher than a predetermined temperature, the motor 82 may be operated to rotate the fan 83. When the fan 83 is rotated, outside air may flow through the plurality of ventilation holes 181 formed in the base plate 18 and pass through the heat sink 84. The heat sink 84 and the thermoelectric element 81 may therefore be cooled, and hot air may be discharged out of an outermost portion of the ventilation holes 181. Since the water temperature sensor 85 may be installed in the protrusion 121 of the bottom plate 12, which has a large contact area that contacts the stored as the water moves toward the pump 20, the water temperature sensor 85 may accurately detect the temperature of the water stored in the water tank 10.

A proximity sensor may be further provided inside the container support 11b at or inside the inner wall 117. The proximity sensor may detect how far a pet is from the water tank 10. The proximity sensor may transmit a signal (e.g., laser signal) through a hole formed in the circumferential surface of the container support 11b or through a signal transmission membrane provided on the circumferential surface of the container support 11b to sense a position of the pet. Since the proximity sensor may continuously detect a position, the controller C may determine whether a pet is approaching the pet water dispenser and/or if a pet is within a predetermined distance range from the pet water dispenser.

When the proximity sensor senses a pet, the controller C may operate the pump 20. There may be a plurality of proximity sensors. The plurality of proximity sensors may each sense a pet. When the plurality of proximity sensors sense a pet, the controller C may determine that a plurality of pets have approached the water dispenser to increase a pumping capacity of the pump.

The warning light 91 may be provided on a lower side of the container support 11b. As an example, the warning light 91 may be a ring-shaped light emitting diode installed below the mounting portion 117.

The warning light 91 may be controlled according to a level in the water tank 10 sensed by the water level sensor 86. The controller C may turn on the warning light 91 to inform the user of a lack of water stored or to refill the water tank 10 when the water level in the water tank 10 detected by the water level sensor 86 is lower than a predetermined water level value.

A power supply device or assembly to operate the pet water dispenser will be described. Referring to FIGS. 2 and 5, the power supply assembly of the pet water dispenser may include the docking station 71. The docking station 71 may include a weight 711 having a sufficient weight for balancing, a cylindrical protrusion or terminal 712 formed at the center of the weight 711, a first terminal, and an electrical wire 713 to supply external power to the first terminal. The weight 711 may also be referred to as a main body or a dockings station base of the docking station 71.

A circular groove or cavity 182 to formed on the bottom surface of the base plate 18 to attach to the protrusion 712. The circular groove 182 may be provided with a second terminal that connects to the first terminal. The base plate 18 may be rotatably coupled to the weight 711, as the protrusion 712 and the circular groove 182 may rotate with respect to each other. The protrusion 712 and the circular groove 182 may be configured so that the first terminal and the second terminal may maintain an electrical connection during rotation. As an example, at least one of the first and second terminals may include a circular electrode. Details of the first and second terminals can be found in U.S. application Ser. No. 16/571,089 filed on Sep. 14, 2019, the entire contents of which are incorporated by reference herein. Therefore, even when the water tank 10 is rotated, the water tank 10 may continue to operate without twisting the electrical wire 713.

A power circuit assembly 715 on a printed circuit board (PCB) may be installed in the inner space of the container support 11b. The power circuit assembly 715 may be electrically connected to the second terminal.

A wireless power transmitter 72 electrically connected to the power circuit assembly 715 may be installed below the bottom plate 12. A wireless power receiver 73 to generate an induced voltage or current in response to an electromagnetic field generated by the wireless power transmitter 72 may be installed in the inner assembly 100 which has been inserted into the water tank 10. The wireless power transmitter 72 may be provided in a space of the protrusion 121 formed in the bottom plate 12, and the wireless power receiver 73 may be provided in the inner assembly 100 between a lower filter cover 43 (provided below the filter assembly 40) and the pump 20. The wireless power transmitter and receiver 72 and 73 may alternatively be wireless power transceivers.

When the inner assembly 100 is coupled to the water tank 10, the lower filter cover 43 may be placed onto the protrusion 121 of the bottom plate 12. The wireless power receiver 73 may be electrically and wirelessly connected to the wireless power transmitter 72. The wireless power receiver 73 and the wireless power transmitter 72 may be positioned to align with each other to generate inductive power.

A sealed space or chamber S may be formed in the inner space of the inner guide wall 53 between the partition plate 38 and an upper filter cover 46 (provided above the filter assembly 40). The space S may be a space sealed from the water tank 10. An auxiliary battery B and the controller C may be installed in the space S.

The wireless power receiver 73 may be connected to the battery B provided in the space S via an electrical wire, or the wireless power receiver 73 can generate an inductive power to charge the battery B. Power may be transmitted from the electrical wire 713 to the wireless power transmitter 72, which induces power in the wireless power receiver 73, which may charge the battery B. The battery B may be electrically connected (via, e.g., a wire) to the pump 20 and/or the controller C.

Since the battery B may be provided in the inner assembly 100, the pump 20 may be operated by electric power supplied from the battery B even if the external power supplied through the electrical wire 713 is damaged, disconnected, or disabled, or the docking station 71 is not provided. Even if the mounting portion 117 of the inner assembly 100 is slightly disturbed or the pet impacts the inner assembly 100 so that the wireless power receiver 73 cannot respond to the wireless power transmitter 72 due to a misalignment, the pump 20 may still be operated by electric power supplied from the battery B.

Figure 6:
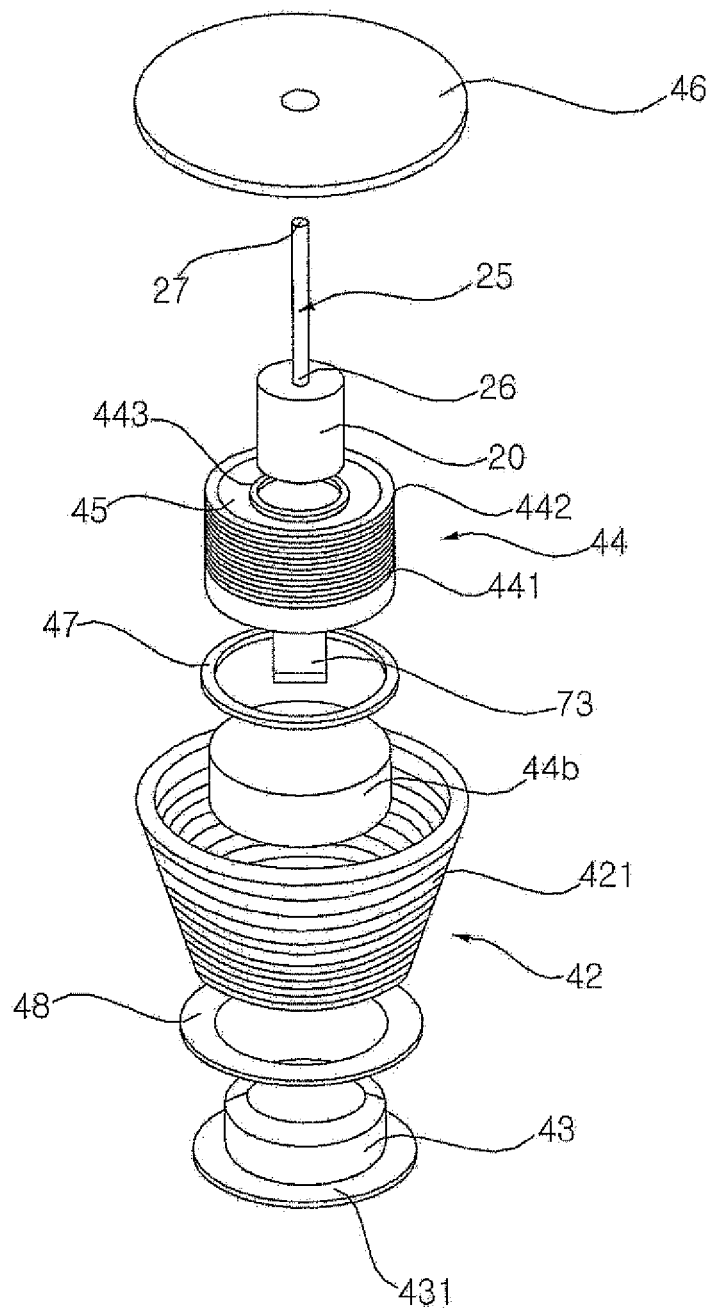
FIG. 6 is an exploded perspective view showing the filter and the pump shown in FIG. 2.
Figure 7:
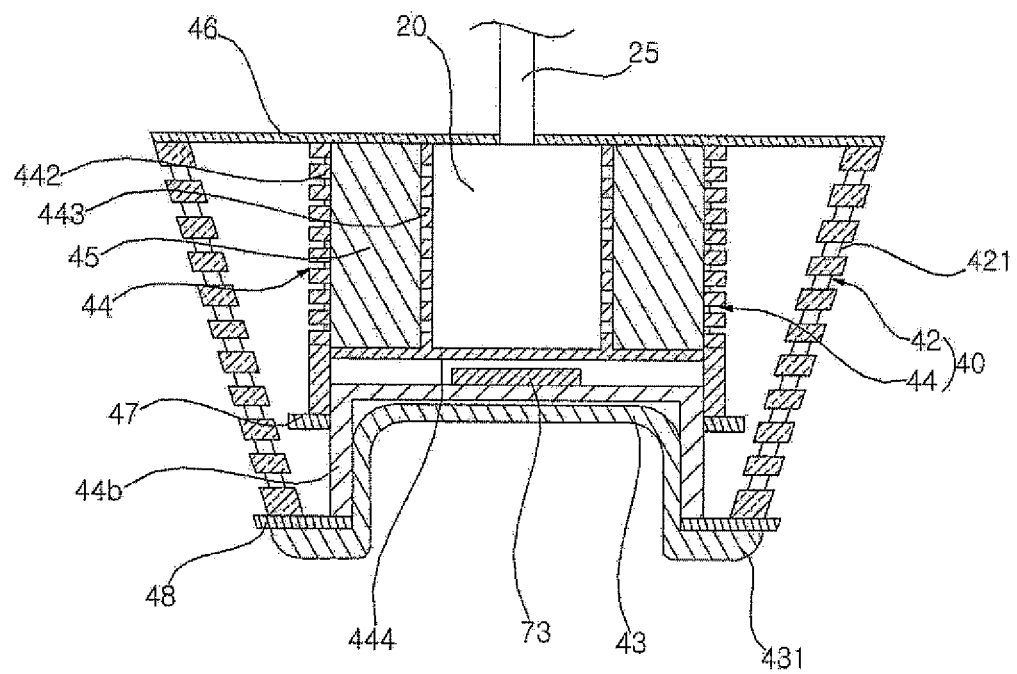
FIG. 7 is a side sectional view of the filter and pump shown in FIG. 2.

Referring to FIGS. 2, 6, and 7, the filter assembly 40 may be formed in a cylindrical or truncated cone shape. The pump 20 may be provided inside the filter assembly 40. A plurality of through holes 421 and 441 may be formed in a circumferential direction on circumferential surfaces of the filter assembly 40. When the pump 20 is installed or located in an inner space of the filter assembly 40, a performance and a pumping efficiency may be improved. Furthermore, the filter assembly 40 may be configured to maintain a positioning of the pump 20, so another structure to fix the pump 20 in place is unnecessary.

The filter assembly 40 may include a first filter 42 having a tubular or truncated conical shape and a second filter 44 having a tubular or truncated conical shape. The second filter 44 may be provided inside the first filter 42, and the pump 20 may be inside the second filter 44. The plurality of through holes 421 may be formed on a circumferential surface of the first filter 42, and the plurality of through holes 441 may be formed on a circumferential surface of the second filter 44.

The first filter 42 may be formed in a cylindrical shape with a rigid material (e.g., stainless steel). The circumferential surface of the first filter 42 may be inclined such that a radius may recede downward and an upper diameter is greater than a lower diameter.

The first filter 42 may filter foreign substances having a particle size larger than the through holes 421. For example, when the pet licks water on the upper surface 31, food in the mouth of the pet can be dropped and mixed with the water stored in the water tank 10. The first filter 42 may prevent such foreign matter from reaching the pump 20.

The first filter 42 may be opened at upper and lower sides (or top and bottom ends). The filter assembly 40 may include the lower filter cover or cap 43, which is provided on the lower side of the first filter 42. The lower filter cover 43 may be formed separately from the first filter 42 and later combined with the first filtering filter 42. Alternatively, the lower filter cover 43 may be formed integrally as a single body with the first filter 42.

The lower filter cover 43 may cover the protrusion 121 formed on the bottom plate 12 of the water tank 10. An inner surface of the lower filter cover 43 may be configured to have a shape corresponding to an outer surface of contour of the protrusion 121. The lower filter cover 43 may be formed to be convex upward so as to insert onto the protrusion 121. The protrusion 121 may be inserted into the lower filter cover 43 through a concave lower side of the lower filter cover 43. The lower filter cover 43 may therefore have a shape that corresponds to the protrusion 121 so that it may easily detachably couple to the protrusion 12. As an example, the lower filter cover 43 may be pressed or friction fitted onto the protrusion 121. As an alternative, an inner side of the lower filter cover 43 may have threads that correspond to threads on an outer side of the protrusion 121, and the lower filter cover 43 may screw onto the protrusion 121 so as to secure the inner assembly 100 to the water tank 10. When the lower filter cover 43 is screwed onto the protrusion 121, the user may have to grip and twist the outer guide wall 51 to remove the inner assembly 100 from the water tank 10.

A flange 431 may be formed at an edge of the lower filter cover 43. The flange 431 may be inserted into the groove 122 formed in the bottom plate 12 around the protrusion 121. The first filter 42 may be stably arranged and secured by the protrusion 121 and the lower filter cover 43.

The second filter 44 may be provided in a hollow center of the first filter 42, and the pump 20 may be installed or located in an inner space of the second filter 44. The second filter 44 may comprise a filter housing and a filter material 45 (e.g., a carbon filter material). The filter housing may include an outer wall 442 formed with the plurality of through holes 441 and an inner wall 443 spaced apart from the outer wall 442 that may also have a plurality of through holes. The filter material 45 may be filled in a space formed between the outer wall 442 and the inner wall 443.

The outer wall 442 and the inner wall 443 may extend vertically or in a longitudinal direction of the filter assembly 40. The filter material 45 may filter foreign matter having a smaller particle size than the through holes 441 formed in the outer wall 442.

A support cylinder 44b may be installed or located inside the first filter 42 below the second filter 44. The support cylinder 44b may be hollow such that it has a cavity or chamber formed therein to accommodate the lower filter cover 43. The wireless power receiver 73 may be provided on top of the support cylinder 44b.

The second filter 44 may be formed with a support plate 444 to support a lower side of the filter material 45 and a lower side of the pump 20. The support plate 444 may be provided under the inner wall 443 of the second filter 42 and extend between sides of the outer wall 442. The outer wall 442 of the second filter 44 may extend past the support plate 444 to couple to the support cylinder 44b. Thus, a sealed space may be formed between the support cylinder 44b, the support plate 444, and the outer wall 442 to accommodate the wireless power receiver 73.

The lower filter cover 43 may be inserted into an opened lower side of the support cylinder 44b. The lower end of the first filter 42 may be seated on an upper surface of the flange 431 of the lower filter cover 43. A first UV filter 47 may be provided below the second filter 44. A second ultraviolet (UV) filter 48 may be provided between the lower end of the first filter 42 and the flange 431. The second UV filter 48 may also be provided under the support cylinder 44b, or may be adjacent to a side of the upper support cylinder 44b.

The lower end of the outer wall 442 of the second filter 44 may be seated on the flange 431, or alternatively may be provided adjacent to a side of the support cylinder 44b. The first UV filter 47 may be provided under a lower end of the second filter 44 and adjacent to a side of the support cylinder 44b. The first and second UV filters 47 and 48 will be described in more detail later.

An upper end of the support cylinder 44b may be coupled to the lower end or side of the second filter 44. Threads may be formed on an inner peripheral surface of the lower end of the second filter 44, and corresponding threads may be formed on an outer peripheral surface of the upper end of the support cylindrical body 44b. The second filter 44 may therefore be screwed onto the support cylinder 44b. Both an upper surface of the support cylinder 44b and the support plate 444 may contact the outer wall 442 of the second filter 44.

The pump 20 may be provided in a hollow space formed inside the inner wall 443 of the second filter 44. Water passed through the first filter 42 and the filter material 45 may be suctioned into the pump 20 through the through holes formed in the inner wall 443 of the second filter 44.

The first UV filter 47 may be ring-shaped and may be provided on an upper peripheral surface of the support cylinder 44b. The first UV filter 47 may include a plurality of first UV LEDs spaced apart from each other along the circumferential direction of the first UV filter 47. The first UV filter 47 may dissolve or kill impurities or bacteria in the water introduced into the first filter 42 by diffusing light generated by the plurality of first UV LEDs.

The plurality of first UV LEDs may be provided on an inner circumferential surface of the first UV filter 47. Therefore, light emitted by the plurality of first UV LEDs may be irradiated or diffused radially outward from the first UV filter 47.

The second UV filter 48 may be ring-shaped and installed below the first filter 42. The second UV filter 48 may be installed on a lower outer circumferential surface of the first filter 42 or on the flange 431. The second UV filter 48 may include a plurality of second UV LEDs spaced apart from each other along a circumferential direction of the second UV filter 48. The second UV filter 48 may dissolve or kill impurities or bacteria in the water stored in the water tank 10 by diffusing light generated by the plurality of second UV LEDs.

The plurality of second UV LEDs may be provided on the inner circumferential surface of the second UV filter 48. Therefore, light emitted by the plurality of second UV LEDs may be irradiated or diffused radially outward from the second UV filter 48.

The upper filter cover 46 may cover the opened upper side of the filter 40 and the lower filter cover 43 may cover the opened lower side of the filter 40. The upper filter cover 46 may be placed on top of the first and second filter filters 42 and 44 at upper sides. The water supply pipe 25 may penetrate the upper filter cover 46. The upper filter cover 46 may seal an upper side of the pump 20 and the upper sides of the first and second filters 42 and 44.

The first and second filters 42 and 44 and the upper filter cover 46 may be joined together by adhesion or fusion so as to be integral with each other. Alternatively, the first and second filters 42 and 44 may be assembled to be detachable from each other by hook structures which mesh with each other or by a screwing method involving threads to facilitate cleaning of the area between the filters 42 and 44. One of the first and second filters 42 or 44 may be optional. Alternatively, a third filter may be provided.

The lower side of the support cylinder 44b may be covered by the lower filter cover 43. The support cylinder 44b and the lower filter cover 43 may be integrally formed as a single piece, or alternatively formed separately and later combined for integration (e.g., pressed fitted, threaded, bonded, or welded). Furthermore, the lower filter cover 43 may be formed integrally with the first filter 42, or alternatively may be formed separately from the first filter 42 and later combined (e.g., pressed fitted, threaded, bonded, or welded).

Figure 8:
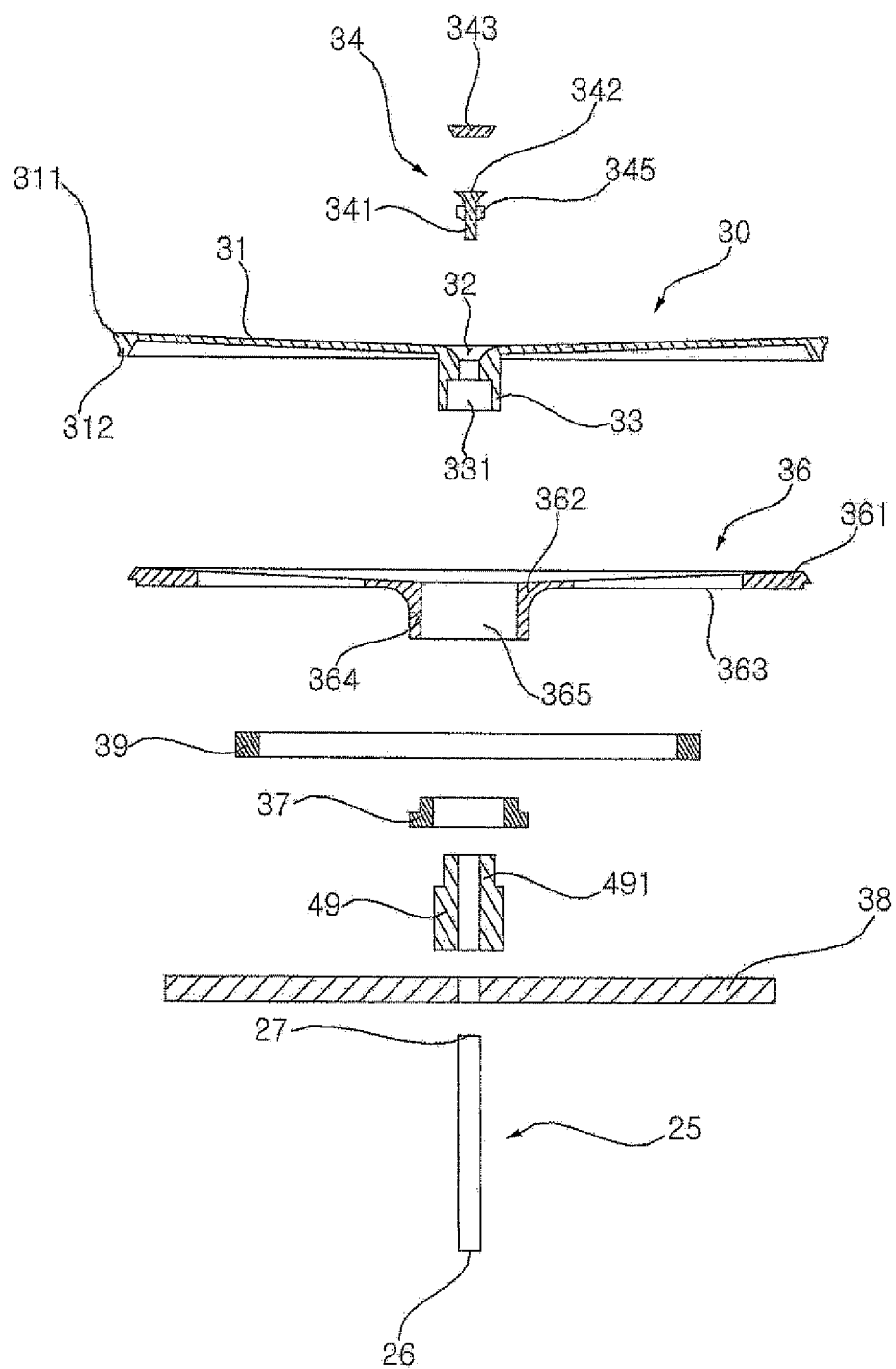
FIG. 8 is an exploded view of a water supply plate shown in FIG. 2.
Figure 9:
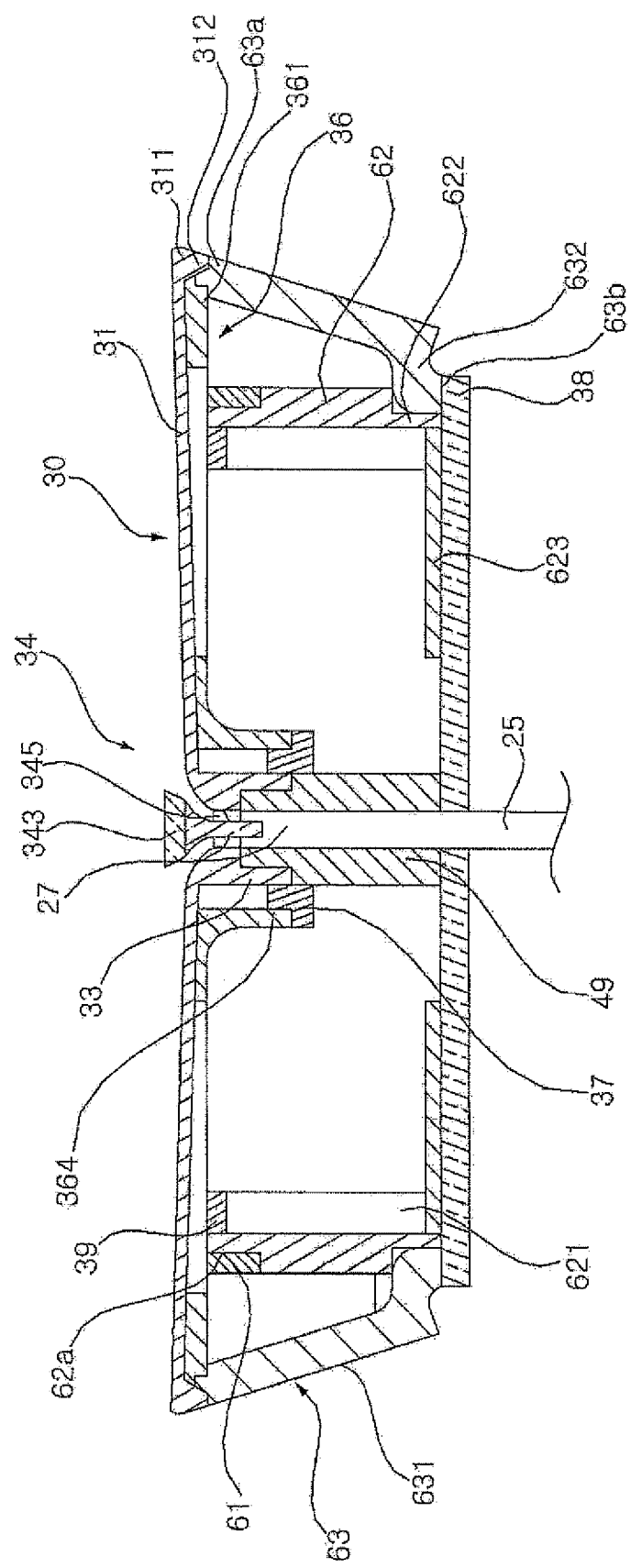
FIG. 9 is a side sectional view of an illumination device shown in FIG. 8 are combined.
Figure 10:
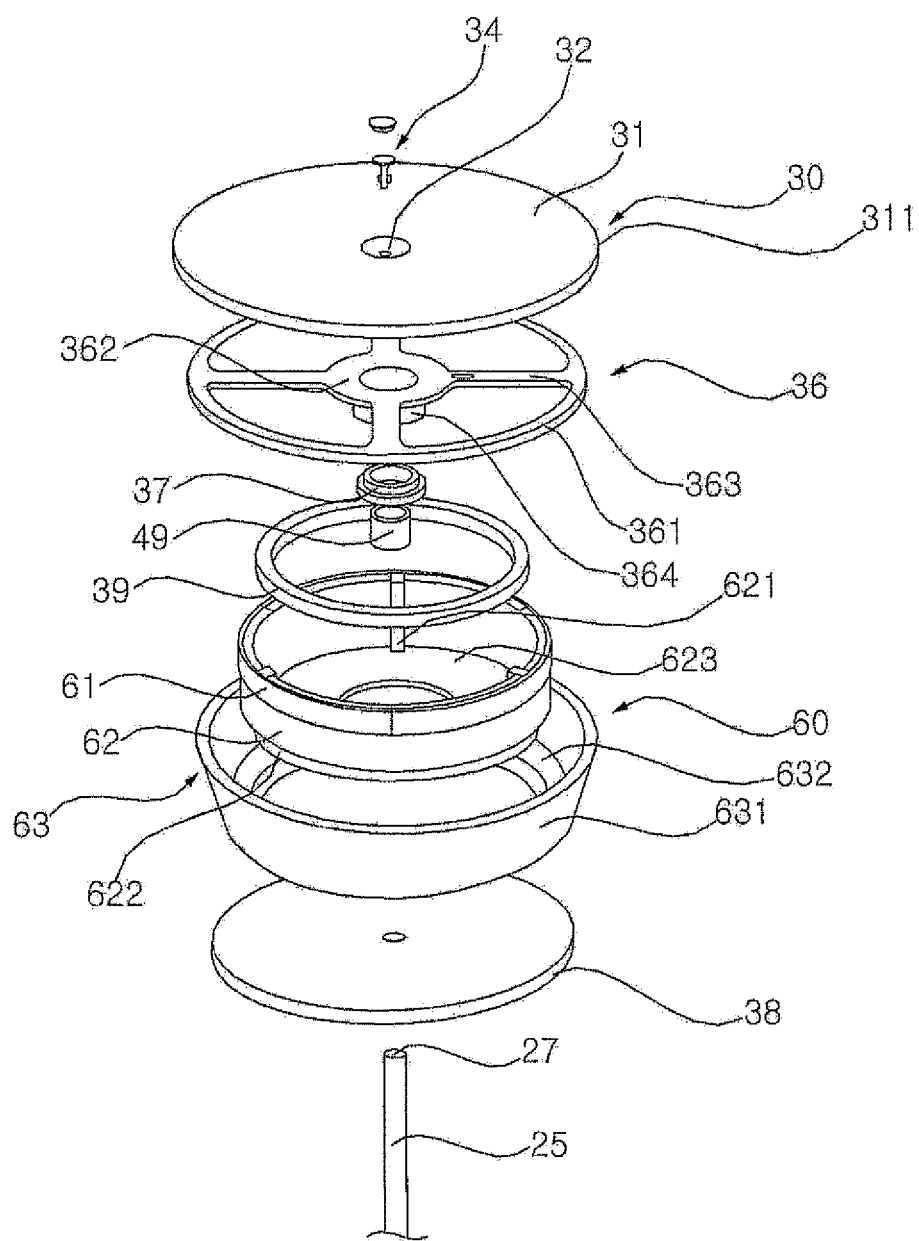
FIG. 10 is an exploded perspective view of FIG. 9.

Referring to FIGS. 8-10, a water inlet 26 may be formed at a lower end of the water supply pipe 25 and a water outlet 27 may be formed at an upper end of the water supply pipe 25. Water discharged from the pump 20 may flow into the water supply pipe 25 through the water inlet 26, move along the water supply pipe 25, and then discharge through the water outlet 27.

The water supply plate 30 may be formed of a plate having a flat and smooth upper surface 31 or a disc shape. Alternatively, the water supply plate 30 may have a curvature to promote downward movement of the water off the edge, or a curvature to promote storage of the water within a center of the water supply plate 30. A water supply hole or water hole 32 may be formed at the center of the water supply plate 30.

A first boss 33 protruding downward may be formed on a lower surface of the water supply plate 30 below the water supply hole 32. The water supply hole 32 may penetrate the first boss 33 in the vertical direction, or in a longitudinal direction of the water supply pipe 25. The first boss 33 may also be referred to as an inner boss.

The water supply hole 32 may supply the water discharged from the water supply pipe 25 to the upper surface 31 of the water supply plate 30. The water moved to the upper surface 31 through the water supply hole 32 may then flow to an edge of the water supply plate 30 and eventually may pass through the water guide 50 to return to the water tank 10, if not consumed by the pet. As previously described, the water may flow along the inclined surface 63C of the support 63 or directly fall into the water guide 50 off the edge of the water supply plate 30.

Shapes of the water supply plate 30 are not limited to disc shapes, concave curves shapes, or convex curved shapes. For example, the water supply plate 30 may be formed in a rectangular plate shape or a triangular plate shape. The water supply plate 30 may be configured to be removable from the inner assembly 100. The water supply plate 30 may be lifted up and removed to be cleaned, repaired, or swapped with another water supply plate 30 having a different height, shape, angle of inclination, material, etc.

The upper surface 31 of the water supply plate 30 may have a sloped surface. The upper surface 31 may be sloped upward from a center toward an edge such that the edge is higher than the center. Such a configuration may collect or pool water at a center of the water supply plate 30. Alternatively, the upper surface 31 may be slowed downward from the center toward the edge such that the center is higher than the edge. Such a configuration may promote a faster flow of water off the edge of the water supply plate 30. An edge 311 of the water supply plate 30 may be formed with an edge protrusion 312 slightly protruding downward so that water falling off the edge 311 of the water supply plate 30 contacts a minimum surface area of the water supply plate 30 before falling off. Alternatively, the protrusion 312 may protrude outward to create surface on which the water may easily flow to the inclined surface 63C.

A diameter of the water supply hole 32 may be gradually increased toward an upper side. A nozzle stopper or plug 34 may be at least partially inserted into the water supply hole 32. A lower end or stem 341 of the plug 34 may be inserted into the water supply hole 32, while an upper end or head 342 of the plug 34 may be spaced upward from the water supply hole 32. Alternatively, the plug 34 may be a float which moves up and down based on water flowing out of the water outlet 27 of the water supply pipe 25, and the float may completely close the water supply hole 32 when the pump 20 is turned off.

The plug or float 34 may serve as a diverter. An outer peripheral surface of the upper end of the plug 34 may include at least one inclined surface having a diameter that increases toward the upper end. Such a shape of the plug 34 may create a fountain effect of water discharged from the water outlet 27. The water discharged from the water outlet 27 may collide with the outer peripheral surface of the upper end of the plug 34 and spread to a side of the upper surface 31.

The plug 34 may include a stem 341 and a head cover or cap 343 coupled to a head 432 of the stem 341. The plug 34 may have a trumpet shape such that the stem 341 is relatively thin, and the head 342 has a width or diameter that increases away from the stem 341. A lower end of the stem 341 may be inserted into the water supply hole 32. A plurality of engaging pieces or ribs 345 spaced apart from each other in a circumferential direction of the stem 341 may be formed on a circumferential surface of the stem 341.

The head 342 may be formed above the stem 341. The head cover 343 may be coupled to the head 342. The head cover 343 may be formed separately from the head 342 and later coupled to the head 342, or alternatively may be integrally formed with the head 342. The head cover 343 may be slightly spaced upward from the water supply hole 32 when the stem 341 of the plug 34 is inserted into the water supply hole 32.

An outer circumferential surface of the head cover 343 may be formed as an inclined surface having a diameter that increases away from the stem 341. The water discharged from the water outlet 27 of the water supply pipe 25 may collide with the outer peripheral surface of the head cover 343 and may spread to the side or edge of the upper surface 31. Depending on the pump capacity of the pump 20 and a shape of the head cover 343 and the head 342, water may not fall off the edge 311 of the water supply plate 30 and may instead pour straight down into the water guide 50.

An end of the water supply pipe 25 (i.e., the water outlet 27) may be inserted into the water supply hole 32, or may alternatively be provided below the water supply hole 32 so that the water outlet 27 may communicate with the water supply hole 32 through the first boss 33. The ribs 345 may contact an inner surface of the water supply hole 32 so that the plug 34 may be supported at a predetermined position in the water supply hole 32. Alternatively, the ribs 345 may be captured within the water supply hole 32. The water supply hole 32 may include grooves to allow the ribs 345 to move up and down based on water being pumped when the plug 34 serves as a float.

The water discharged from the water outlet 27 may be supplied to the center of the upper surface 31 while being sprayed in the form of a ring through the water supply hole 32 against the head 342 and the head cover 343 of the plug 34. The water supplied to the center of the upper surface 31 may flow along the upper surface 31 toward the edge 311 of the water supply plate 30. The water supply plate 30 may be made of stainless steel, or alternatively may be made of a transparent or semi-transparent material. The water supply plate 30 may be formed to have a thin thickness.

A plate support 36 to support the water supply plate 30 may be provided below the water supply plate 30. The plate support 36 may be supported by a light base or support 62 and/or the support or light diffuser 63. The plate support 36 may include an outer ring 361 provided below an outer side of the water supply plate 30. The outer ring 361 may couple to the top of the support plate 53 and/or may contact the protrusion 312 under the edge 311 of the water supply plate 30. A hub ring 362 may be positioned under a center of the water supply plate 30, and spokes 363 may extend between the hub ring 362 and the outer ring 361.

A second boss 364 may protrude from a lower side of the hub ring 362. The first boss 33 of the water supply plate 30 may be inserted into a hole or cavity 365 formed in the hub ring 362 and the second boss 364. A sealing ring 37 may be forcedly inserted into the hole 365 to be provided between first boss 33 and the second boss 364. Thus, the sealing ring 37 may be inserted into the hole 365 of the second boss 364, and the first boss 33 may be inserted into a hole or inner space of the sealing ring 37. The sealing ring 37 may be made of an elastic material (e.g., rubber), and may also be referred to as a packing or rubber ring.

The water supply pipe 25 may be inserted through a hole in the partition plate 38. A third UV filter 49 to sterilize water passing through the water supply pipe 25 or discharging from the water outlet 27 may be provided around the water supply pipe 25. The third UV filter 49 may be formed in a cylindrical shape having a length. The upper end of the water supply pipe 25 may pass through the third UV filter 49.

The third UV filter 49 may comprise a plurality of third UV LEDs spaced apart from each other along a circumferential direction of the third UV filter 49. The third UV filter 49 may dissolve or kill impurities or bacteria of the water to sterilize water discharged from the water outlet 27. The plurality of third UV LEDs may be provided on a lower surface of the third UV filter 49 along the circumferential direction. Accordingly, light generated by the plurality of third UV LEDs may be irradiated or diffused to an upper side of the third UV filter 49.

An insertion hole 331 may be formed in a lower portion of the first boss 33. The hole 331 may be formed wider than the water supply hole 32. An upper end 491 of the third UV filter 49 may be inserted into the hole 331.

The upper end 491 of the third UV filter 49 may have a smaller diameter than the rest of the third UV filter 49 (e.g., a lower end or portion of the third UV filter 49), and may be inserted into the hole 331. An upper end of the sealing ring 37 may similarly have a diameter smaller than the rest (e.g., a lower end or portion) of the sealing ring 37, and may be inserted between the first boss 33 and the second boss 364.

The lower portion of the sealing ring 37 may support a lower end of the second boss 364. The lower end of the third UV filter 49 may be inserted into the lower end of the sealing ring 37. The lower end of the third UV filter 49 may be placed on the partition plate 38. The water supply pipe 25 may penetrate the interior of the third UV filter 49.

The upper end 491 of the third UV filter 49 may be installed at the same position as the outlet 27, or alternatively may be installed so as to cover a position higher than the outlet 27, thereby acting as an extension of the outlet 27. When the upper end 491 of the third UV filter 49 is provided above the outlet 27, the upper end 491 of the third UV filter 49 may sterilize water directly.

A reinforcing ring 39 may be provided on a bottom surface of the plate support 36. The reinforcing ring 39 may be supported by reinforcing ribs 621 of a light base or support 62. The reinforcing ring 39 may be plastic, but a material of the reinforcing ring 39 is not limited to plastic.

The water supply plate 30 may be detachably assembled to the inner assembly 100. The sealing ring 37 may couple the water supply plate 30 to the plate support 36. The water supply plate 30 may be lifted or separated from the plate support 36 to overcome an elastic or frictional force of the sealing ring 37. The user may replace a damaged water supply plate 30 with a new water supply plate 30, or may swap the water supply plate 30 with another water supply plate having a different shape, height, or angle of inclination.

An illumination assembly 60 may be installed below the water supply plate 30 and the plate support 36. The illumination assembly 60 may include a light emitting device 61, a light support or base 62 on which the light emitting device 61 is installed, and a support 63 provided on a periphery of the light base 62. The support 63 may serve as a light diffuser and also be referred to as a light guide. The illumination assembly 60 may also be referred to as a lighting device.

The support 63 may be formed in a cylindrical shape, and may include the inclined surface 63C. Thus, the support 63 may be formed to have a wider diameter toward an upper side. An upper surface or end 63a of the support 63 may be in contact with the protrusion 312 of the water supply plate 30 and the outer ring 361 of the plate support 36 as shown in FIG. 9. A lower surface 63b of the support 63 may be brought into contact with the partition plate 38.

An outer circumferential surface 631 of the support 63 may form the inclined surface 63C. Based on the flow of water pumped by the pump 20, the water dropped from the edge 311, if falling fast enough, may fall vertically without flowing along the support 63. The dropping or cascading of water creates a waterfall to simulate running water which is pleasing for animals.

The light emitting device 61 may be formed of a plurality of light emitting diodes (LEDs) attached to the light base 62 to form an array of predetermined shapes, or formed in a ring shape and attached to an outer periphery of the light base 62.

The reinforcing rib 621 may be formed on an inner circumferential surface of the light base 62. The reinforcing ribs 621 may support reinforcing rings 39. A recess or groove 622 may be formed on a lower outer circumferential surface of the light base 62. An inward protrusion 632 protruding inwardly from a lower end of the support 63 may be inserted into the recess 622.

The light emitting device 61 may be formed in a ring shape, and may be installed on an upper outer peripheral surface of the light base 62. A concave portion or groove 62a may be formed on the upper outer peripheral surface of the light base 62, and the light emitting device 61 may be inserted into the groove 62a. A printed circuit board (PCB) 623 to control a light emission of the light emitting device 61 may be extend horizontally from an inside of the light base 62 so as to be placed on the upper surface of the partition plate 38. The light base 62, the support 63, and the partition plate 38 may be bonded or welded together for integration, or alternatively may be assembled to be detachable from each other.

Figure 11:
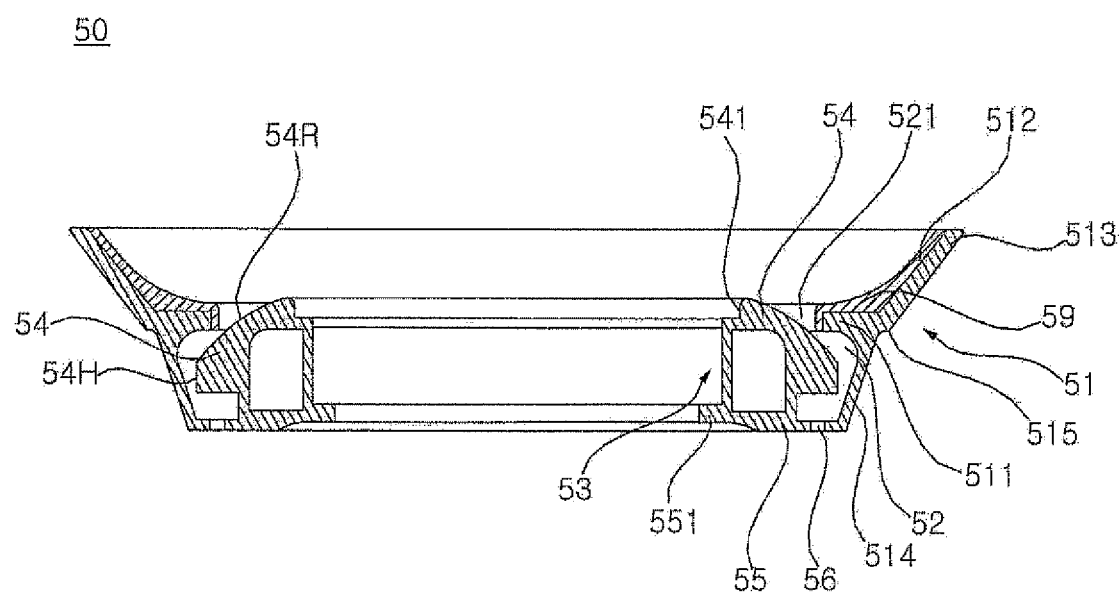
FIG. 11 is a side cross-sectional view showing a water guide shown in FIG. 2.

Referring to FIG. 11, the water guide 50 may include an outer wall or outer guide wall 51 forming an outer rim, an inner guide wall or inner support wall 53 forming an inner rim, and a drain passage 52 formed between the outer and inner guide walls 51 and 53. The water guide 50 may further include a bottom wall 55 connecting lower ends of the outer and inner guide walls 51 and 53.

The bottom wall 55 may be provided with a discharge hole 56 to discharge the water supplied from the water supply plate 30 or the support 63 to the drainage passage 52 of the water guide 50. The discharge hole 56 may be formed of at least one arc-shaped hole, a ring-shaped hole, or a circular hole formed along a circumferential direction of the bottom wall 55.

The inner wall 53 may be provided below and coupled to the support 63. A guide 54 may be formed on the inner guide wall 53. The guide 54 may protrude from an upper end of the inner guide wall 53 toward the outer guide wall 51, but may be inclined or curved downward so as not to contact the outer guide wall 51. Water may thus be guided along the guide 54 to flow down the drainage passage 52.

The guide 54 may receive water flowing down an outer peripheral surface of the support 63 and guide the water downward. Further, the guide 54 may receive the water falling off the edge 311 of the water supply plate 30 and guide the water downward.

The outer or upper surface of the guide 54 may include a convex rounded surface or round surface 54R. The round surface 54R may couple to a lower end of the support 63, and may be configured such that water flowing downward along the inclined surface 63C is slowed down by the round surface 54R to eventually flow through the discharge hole 56, thus reducing noise from falling or splashing water.

The outer surface of the guide 54 may further include a vertical or longitudinal surface 54H extending downward from a lower end of the round surface 54R. The vertical surface 54H may be spaced apart from the bottom wall 55.

The guide 54 may be provided lower than an upper end or portion of the outer wall 51. The outer guide wall 51 may prevent water from falling or splashing outside of the water tank 10. Although the guide 54 is shown to be formed on the inner guide wall 53, the guide 54 may alternatively be provided on an inner side of the outer guide wall.

A groove 541 may be formed at an the upper end of the guide 54 at an inner end of the round surface 54R. The partition plate 38 may be placed in the groove 541. The support 63 may have a shape corresponding to a corner or end of the round surface 54R and be placed on the end of the round surface 54R.

The water guide 50 may be assembled to be detachable from the support 63 and the partition plate 38, or alternatively may adhered or fused to at least one of the support 63 and the partition plate 38. When the water guide 50 is assembled to be detachable from the support 63 and the partition plate 38, the water guide 50 may be replaced by a newer water guide 50 or swapped with a water guide having a different shape or height.

A protrusion 511 may extend from an inner side surface of the outer guide wall 51 toward the guide 54. An inner surface 512 of the outer guide wall 51 may extend upward from the protrusion 511. The inner surface 512 may be an inclined surface that widens upward.

A narrow drainage passage 521 may be formed between the protrusion 511 and the guide 54. Water dropped from the water supply plate 30 into the water guide 50 may flow through the narrow drainage passage 521 after flowing on the guide 54 and the protrusion 511 or inner surface 512. The narrow drainage passage 521 may also filter the water flowing from the guide 54 and the protrusion 511.

A covering or coating 59 may be formed on the inner surface 512 and an upper surface of the protrusion 511. The coating layer 59 may be formed of a material different from that of the water guide 50. The guide 54 may be formed of a material different from the rest of water guide 50, so that the aesthetics may be enhanced. The coating 59 and/or the surfaces of the guide 54, inner surface 512, and protrusion 511 may be made smooth to prevent water from scattering.

An upper end of the outer guide wall 51 may be formed to be higher than the inner guide wall 53 and may protrude from the upper wall 11a of the water tank. A radius of the upper end of the outer guide wall 51 may be wider than the radius of the upper end of the upper wall. Although the radius of the water container 10a may recede upward, the radius of the outer guide wall 51 may increase upward. Thus, the water guide 50 may slope or tilt in a direction opposite to the water container 10, and the outer guide wall 51 may protrude from the upper wall 11a by a predetermined angle θ. The predetermined angle θ may be 120 degrees.

The outer guide wall 51 may further include an upper inclined surface 513 and a lower inclined surface 514 *e* formed on an outer peripheral surface of the outer guide wall 51. An inclination of the upper inclined surface 513 may be different from an inclination of the lower inclined surface 514, or alternatively, the upper and lower inclined surfaces 513 and 514 may have the same or a similar inclination. The upper inclined surface 513 may protrude outward from the lower inclined surface 514.

A step portion or step 515 may be further formed between the upper inclined surface 513 and the lower inclined surface 514 on the outer peripheral surface of the outer wall 51. The step portion 515 may be formed at a position corresponding to the lower surface of the protrusion 511.

The lower inclined surface 514 may be supported by the inner tank wall 113 (FIG. 3). The step portion 515 of the water guide 50 may be seated on an upper surface of first protruding plate 111. The upper inclined surface 513 may be supported by the bumper 115. The water guide 50 may therefore be securely provided above the water tank 10.

A protruding jaw or extension 551 may extend from a lower end of the inner guide wall 53 and/or the bottom wall 55. The protruding jaw 551 may be positioned above and coupled to the upper filter cover 46. The upper filter cover 46 may cover an open inner side within the protruding jaw 551. The protruding jaw 551 and the upper filter cover 46 may be detachably assembled via an arm, hook, screw etc. Alternatively, the protruding jaw 551 of the water guide 50 and the upper filter cover 46 may be joined by fusion or adhesion.

As described above, the filter assembly 40, the pump 20, the water supply pipe 25, the water supply plate 30, the illumination assembly 60, and the water guide 50 may be integrally formed or separately assembled to form a single inner assembly 100. The inner assembly 100 may be easily separated from the water tank 10, the water in the water tank 10 may be easily exchanged or replaced, and the pet water dispenser may be easily cleaned or repaired.

When the inner assembly 100 is installed in the water tank 10, the water guide 50 may coupled to the water tank 10 when the outer inclined surface 514 formed on the outer guide wall 51 couples to the inner tank wall 113. In addition, the filter assembly 40 may couple to the protrusion 121 when the lower filter cover 43 is inserted onto the protrusion 121, and the flange 431 is placed on the groove 122. When the inner assembly 100 is installed in the water tank 10, the inner assembly 100 may be stably installed at a predetermined position without being moved in the water tank 10. When the user lifts the outer guide wall 51 of the water guide 50 with the hand, the inner assembly 100 may be lifted to be detached or removed from the water tank 10.

Figure 12:
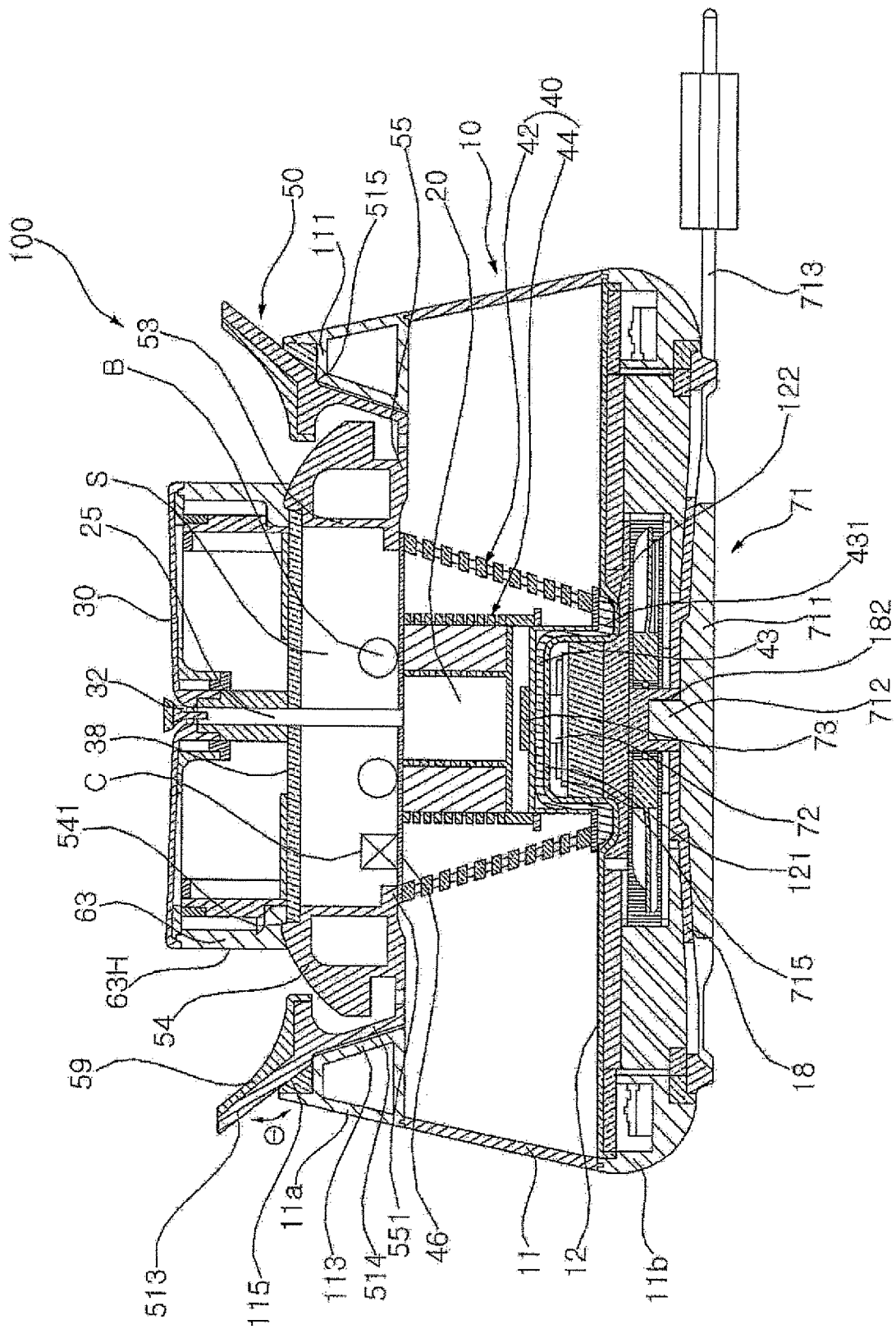
FIG. 12 is a side sectional view of a pet water dispenser according to an embodiment.

Referring to FIG. 12, the support 63 may not have an inclined surface. Otherwise, the same reference numerals are given to the same components as those of an embodiment in FIGS. 1-11, and a detailed description thereof will be omitted. Only different points or features will be described.

An outer peripheral surface of the support 63 may be formed as a vertical surface 63H. The water supplied to the upper surface 31 of the water supply plate 30 may fall off the edge of the water supply plate 30 and then either flow down the vertical surface 63H of the support 63 when a small amount of water is pumped by the pump 20 or flow directly to the water guide 50 when a large amount of water is pumped by the pump 20.

The pet may drink water flowing along the upper surface 31 of the water supply plate 30 or may drink water falling down from the edge of the water supply plate 30. The upper surface 31 may be formed as a convex or inclined surface having a high edge height and a low center height to collect still water. The pet may therefore drink the collected water on the upper surface 31 of the water supply plate 30. Further, the water guide 50 may cover an open upper side of the water tank 10. Therefore, foreign substances contained in the external water and the mouth of the pet do not flow into the water tank 10, preventing contamination.

While the present invention has been particularly shown and described with reference to exemplary embodiments thereof, it is to be understood that the disclosure is not limited to the disclosed exemplary embodiments, but, on the contrary, It should be understood that various modifications may be made by those skilled in the art without departing from the spirit and scope of the present disclosure.

This application is related to U.S. application Ser. No. 16/571,245 filed on Sep. 16, 2019, U.S. application Ser. No. 16/571,093 filed on Sep. 14, 2019, U.S. application Ser. No. 16/571,090 filed on Sep. 14, 2019, U.S. application Ser. No. 16/571,089 filed on Sep. 14, 2019, U.S. application Ser. No. 16/571,076 filed on Sep. 14, 2019, U.S. application Ser. No. 16/571,075 filed on Sep. 14, 2019, U.S. application Ser. No. 16/571,073 filed on Sep. 14, 2019, U.S. application Ser. No. 16/570,310 filed on Sep. 13, 2019, U.S. application Ser. No. 16/570,279 filed on Sep. 13, 2019, U.S. application Ser. No. 16/569,827 filed on Sep. 13, 2019, U.S. application Ser. No. 16/659,841, filed on Sep. 13, 2019, and U.S. application Ser. No. 16/569,908 filed on Sep. 13, 2019, the entire contents of which are incorporated by reference herein.

Further, the following Korean Applications are also incorporated herein by reference: 10-2018-0122992 filed on Oct. 16, 2018; 10-2018-0123552 and 10-2018-0123553 filed on Oct. 17, 2018; 10-2018-0131037 filed on Oct. 30, 2018; 10-2018-0131405 filed on Oct. 31, 2018; 10-2019-0059513 and 10-2019-0059514 filed on May 21, 2019; 10-2018-0133062 filed on Nov. 1, 2018; 10-2019-0059787 filed on May 22, 2019; 10-2019-0060918, 10-2019-0060919, and 10-2019-0060920 filed on May 24, 2019; and 10-2019-0080603 and 10-2019-0080604 filed on Jul. 4, 2019.

Embodiments disclosed herein may be implemented as a liquid dispenser that supplies drinking water to an animal such as a pet. However, embodiments disclosed herein are not limited to pets. For example, the liquid dispenser may be used in a zoo to supply drinking water to animals kept in a zoo, research areas, wildlife preservation areas, etc.

Embodiments disclosed herein may be implemented as a pet water dispenser capable of simultaneously realizing water flowing along a surface of a water supply container or plate and water falling from the water supply container or plate. The pet water dispenser may further store or collect water in the water supply container or plate. The pet water dispenser may be capable of preventing foreign substances, such as food stuck to a pet, from entering an inside of a water tank. The problems solved by the present disclosure are not limited to the above-mentioned problems, and other problems not mentioned can be clearly understood by those skilled in the art from the following description.

A pet water dispenser according to an embodiment may include a water tank having an opened upper side and an inner assembly covering the opened upper side of the water tank. The inner assembly can constitute an upper surface and a support or support wall to project the upper surface upward. An upper end of an outer circumference of the support may be located at an edge of the upper surface. The outer circumferential surface of the support may be formed as an inclined surface which is closer to an inside of the support from a top to a bottom.

An upper portion of the inner assembly may protrude above the water tank, and a lower portion of the inner assembly may be inserted into the water tank. A pump to feed or pump water in the water tank to the upper surface may be provided at the lower portion of the inner assembly.

Water pumped to the upper surface may fall down off the edge of the upper surface if the pumping capacity of the pump is high. If the pumping capacity of the pump is low, the water pumped to the upper surface may flow downward along the outer peripheral surface of the support at the edge of the upper surface.

The pet may drink water flowing on the upper surface. In addition, the pet may drink water falling down off the edge of the upper surface.

The inner assembly may include a water supply plate having the upper surface, a water supply pipe connecting the water supply plate and the pump, and a plate support to dispose or drain the water supply plate above the water tank and forming the support.

The water can be transferred along the water supply pipe connected to the pump installed or provided in the water tank. A water supply hole communicating with the water supply pipe may be formed in the water supply plate, and water supplied through the water supply hole may flow to the upper surface of the water supply plate. The upper end of the outer circumference of the plate support may be positioned below the edge of the water supply plate. The outer circumferential surface of the plate support may be formed as an inclined surface that approaches the inner side of the plate support from the top to the bottom.

The pump may have a variable pumping capacity. The plate support may be formed in a cylindrical shape. An illumination or lighting assembly may be provided inside the plate support, and the plate support may be formed of a light emitting member or device that emits light.

The edge of the water supply plate may be formed as a convex curved surface to the outside of the water supply plate. The upper surface of the water supply plate may have a sloped surface with a high edge and a low center.

The water supply hole may be formed at the center of the water supply plate. The lower end of a nozzle plug or stopper, or a plug, may be inserted into the water supply hole, and the upper end of the nozzle plug may be spaced upward from the water supply hole. An outer circumferential surface of the upper end of the nozzle plug may include at least one inclined surface that is closer to the inside of the nozzle plug from the top to the bottom.

The water guide, which may also be referred to as a water receptacle, covering the opened upper side of the water tank may be provided with a discharge hole for discharging the water supplied from the water supply plate or the plate support to the water tank. The plate support can connect the water supply plate and the water receiver.

The water guide may be composed of an outer wall or outer guide wall forming an outer rim, an inner wall or inner guide wall forming an inner rim, and a bottom wall connecting the lower portion of the outer wall and the lower portion of the inner wall. A drainage passage may be formed between the outer wall and the inner wall. The discharge hole may be formed in the bottom wall. The lower end of the plate support may be connected to the upper side of the inner side wall.

The inner wall may be provided below the plate support. A guide may be formed on the inner wall. The guide may protrude from the lower end of the outer periphery of the plate support toward the outer wall.

The outer surface of the guide may be formed with a convex round surface outside the guide. The round surface may be formed at a predetermined interval downward from the lower end of the plate support. The outer surface of the guide may further include a vertical surface extending downward from a lower end of the round surface. The vertical surface may be spaced upward from the bottom wall. The lower side of the plate support may be opened. The water supply pipe may penetrate the partition plate covering the opened lower side of the plate support. The upper side of the inner wall may be opened. The partition plate may be inserted into a groove formed on the upper side of the inner side wall to cover the opened upper side of the inner side wall.

A tubular filtration filter or filter assembly to filter the water stored in the water tank may be connected to the lower side of the inner wall of the water guide. The pump may be provided inside the filtration filter.

An upper side of the filtration filter may be open. The water supply pipe may penetrate an upper filter cover covering the opened upper side of the filtration filter. A protruding jaw or chin may be formed on a lower side of the inner circumferential surface of the inner guide wall. The protruding jaw may extend inward of the inner guide wall. The protruding jaw may be opened inward. The upper filter cover may be coupled to the protruding jaw to cover the opened inner side of the protruding jaw.

The lower side of the filtration filter may be open. A lower filter cover covering the opened lower side of the filtration filter may be formed to be convex upward. The bottom plate of the water tank may have a tubular protrusion or protrusion protruding upward. The protrusion may be inserted into the lower filter cover.

The plate support may connect the water supply plate and the water receiver. The outer circumferential surface of the plate support may be formed as a vertical surface. The details of other embodiments are included in the detailed description and drawings.

The plate support may place or position the water supply plate above the water tank. An outer circumferential surface of the plate support may be formed as an inclined surface that approaches the inside of the plate support from the top to the bottom. Alternatively, the outer circumferential surface of the plate support may be formed as a vertical surface. When the amount of water supplied to the upper surface of the water supply plate is small, water supplied to the upper surface of the water supply plate may flow downward along the outer circumferential surface of the plate support at the edge of the water supply plate. When the amount of water supplied to the upper surface of the water supply plate is large, water supplied to the upper surface of the water supply plate may drop or fall directly downward from the edge of the water supply plate without passing through or along the outer peripheral surface of the plate support. The pet may drink water flowing along the upper surface of the water supply plate and/or drink water falling down from the edge of the water supply plate.

Further, the upper surface of the water supply plate may be formed as an inclined surface with a high edge and a low center. Therefore, the water supplied to the upper surface of the water supply plate may be floated or collected on the upper surface of the water supply plate. The pet may drink the taller or higher water on the upper surface of the water supply plate.

Further, the open upper side of the water tank may be covered. Therefore, there is also an effect that contamination of the water contained in the water tank can be prevented, because foreign matter and food stuck to the snout of the pet do not flow into the inside of the water tank. The effects of the present invention are not limited to the effects mentioned above, and other effects not mentioned can be clearly understood by those skilled in the art from the description of the claims.

Embodiments disclosed herein may be implemented as a liquid dispenser comprising a tank having an upper opening, a pump configured to pump liquid stored in the tank, a pipe connected to the pump through which liquid flows, a top plate provided over the upper opening of the tank and having a supply hole communicating with the pipe, and a support supporting the top plate having an outer surface positioned below an edge of the plate. The outer surface of the support may be an inclined surface that may be tilted inward such that a radius of a top of the support may be different from a radius of a bottom of the support. The pump may have a variable pumping capacity. The support may be formed in a truncated conical shape.

An illumination assembly may be provided within the support. The support may diffuse and transmit light emitted by a light emitting device of the illumination assembly.

An edge of the top plate may be formed as a convex surface curved downward. An upper surface of the top plate may be formed as an inclined surface such that an edge of the upper surface may have a height greater than a height of the center of the upper surface. The supply hole may be formed at a center of the top plate.

A plug may be provided to have a stem inserted into the supply hole and a head spaced upward from the supply hole. The head of the plug may include at least one inclined surface tilted outward from a bottom of the head to a top of the head.

A liquid guide may be formed with a discharge hole. The liquid guide and the top plate may cover the upper opening of the tank and the discharge hole may discharge liquid supplied from the top plate or the support to the tank. The support may extend between the top plate and the liquid guide.

The liquid guide may further include an outer guide wall forming an outer rim, an inner guide wall forming an inner rim, a drainage passage formed between the inner guide wall and the outer guide wall, and a bottom wall connecting lower ends of the outer and inner guide walls and having the discharge hole formed therein. A lower end of the support may be coupled to an upper end of the inner guide wall. A guide formed on the inner guide wall may protrude past the lower end of the support toward the outer guide wall. The guide may include a round surface curved downward from the lower end of the plate support. The guide may further include a vertical surface extending downward from a lower end of the round surface, and the vertical surface may not contact the bottom wall.

A partition plate may be inserted into a groove formed on the upper end of the inner guide wall to cover an upper opening of the inner guide wall and a lower opening of the support. The pipe may penetrate the partition plate.

A filter assembly may be connected to the lower end of the inner guide wall to filter liquid stored in the tank. The pump may be provided within the filter assembly. An upper filter cover may cover an upper opening of the filter. An extension may extend inward from the lower end of the inner guide wall. The upper filter cover may be coupled to the extension, and the pipe may penetrate the upper filter cover. A lower filter cover may cover a lower opening of the filter assembly. A bottom plate may form a bottom surface of the tank and include a projection protruding upward. The lower filter cover may be configured to have a cavity in which the protrusion may be inserted.

Embodiments disclosed herein may be implemented as a liquid dispenser comprising a tank having an upper opening, a pump provided to pump liquid stored in the tank, a pipe connected to the pump, a top plate having a supply hole communicating with the pipe and having an upper surface on which liquid supplied through the supply hole flows, a liquid guide to cover the upper opening of the tank and having a discharge hole to discharge liquid into the tank, and a support which connects the top plate and the liquid guide and positions the top plate above the opened top of the tank. An outer circumferential surface of the support may be formed as an inclined surface that may be tilted inward from a top of the support to a bottom of the support.

Embodiments disclosed herein may be implemented as a liquid dispenser comprising a tank, a pump inserted in the tank and configured to pump liquid in the tank, a pipe connected to the pump to transfer liquid, a plate having a hole communicating with the pipe, wherein liquid flows across an upper surface of the plate, and a support supporting the plate to be provided above the tank. A top end of the support may be provided below an edge of the plate. The support may extend in a vertical direction.

A liquid guide may have a discharge hole to discharge liquid falling from the plate into the tank. The liquid guide and the plate may cover a top opening of the tank. The support may be supported by the liquid guide.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser, comprising:
   a tank having an upper opening;
   a pump configured to pump liquid stored in the tank;
   a pipe connected to the pump through which liquid flows;
   a top plate provided over the upper opening of the tank and having a supply hole communicating with the pipe to receive liquid from the pipe;
   a cylindrical wall positioned below the top plate and including an outer surface having a recess;
   a support positioned radially outside of the cylindrical wall and supporting the top plate, the support having an outer surface positioned below an edge of the top plate and a protrusion extending inward and received in the recess of the cylindrical wall;
   an illumination assembly provided within the support and above the recess on the outer surface of the cylindrical wall; and
   a liquid guide formed with a discharge hole, the liquid guide and the top plate covering the upper opening of the tank, and the discharge hole discharging liquid supplied from the top plate or the support to the tank,
   wherein liquid from the top plate flows downward along the outer surface of the support, and the outer surface of the support is an inclined surface that is tilted inward such that a radius of a top of the support corresponds to a radius of the top plate and is different from a radius of a bottom of the support,
   wherein the liquid guide includes an outer guide wall forming an outer rim and least partially protruding upward and outward from the tank at the upper opening, and
   wherein the illumination assembly is positioned around the pipe.

2. The liquid dispenser of claim 1, wherein the pump has a variable pumping capacity.

3. The liquid dispenser of claim 1, wherein the support is formed in a truncated conical shape.

4. The liquid dispenser of claim 3, wherein the support diffuses and transmits light emitted by a light emitting device of the illumination assembly.

5. The liquid dispenser of claim 1, wherein the edge of the top plate is formed as a convex surface curved downward.

6. The liquid dispenser of claim 1, wherein an upper surface of the top plate is formed as an inclined surface such that an edge of the upper surface has a height greater than a height of a center of the upper surface.

7. The liquid dispenser of claim 6, wherein the supply hole is formed at a center of the top plate.

8. The liquid dispenser of claim 1, further including a plug having a stem inserted into the supply hole and a head spaced upward from the supply hole, wherein the head of the plug includes at least one inclined surface that tilted outward from a bottom of the head to a top of the head.

9. The liquid dispenser of claim 1, wherein the support extends between the top plate and the liquid guide.

10. The liquid dispenser of claim 9, wherein the liquid guide further includes:
    an inner guide wall forming an inner rim,
    a drainage passage formed between the inner guide wall and the outer guide wall,
    a bottom wall connecting lower ends of the outer and inner guide walls and having the discharge hole formed therein, wherein a lower end of the support is coupled to an upper end of the inner guide wall.

11. The liquid dispenser of claim 10, wherein at least one guide surface is formed on the inner guide wall and protrudes past the lower end of the support toward the outer guide wall.

12. The liquid dispenser of claim 11, wherein the at least one guide surface includes a round surface curved downward from the lower end of the support.

13. The liquid dispenser of claim 12, wherein the at least one guide surface further includes a vertical surface extending downward from a lower end of the round surface, and the vertical surface does not contact the bottom wall.

14. The liquid dispenser of claim 10, further comprising a partition plate inserted into a groove formed on the upper end of the inner guide wall to cover an upper opening of the inner guide wall and a lower opening of the support, wherein the pipe penetrates the partition plate.

15. The liquid dispenser of claim 10, further comprising a filter assembly connected to the lower end of the inner guide wall to filter liquid stored in the tank, the pump being provided within the filter assembly.

16. The liquid dispenser of claim 15, further comprising:
    an upper filter cover covering an upper opening of the filter assembly,
    an extension extending inward from the lower end of the inner guide wall, wherein the upper filter cover is coupled to the extension, and wherein the pipe penetrates the upper filter cover.

17. The liquid dispenser of claim 15, further including:
    a lower filter cover covering a lower opening of the filter assembly, and a bottom plate forming a bottom surface of the tank and including a projection protruding upward, wherein the lower filter cover is configured to have a cavity in which the projection is inserted.

18. A liquid dispenser, comprising:

a tank having an upper opening;

a pump provided to pump liquid stored in the tank;

a pipe connected to the pump;

a top plate having a supply hole communicating with the pipe and having an upper surface on which liquid supplied through the supply hole flows;

a liquid guide to cover the upper opening of the tank and having a discharge hole to discharge liquid into the tank;

a support which connects the top plate and the liquid guide and positions the top plate above the upper opening of the tank, the support including a protrusion extending radially inward;

a wall positioned provided under the top plate and including an outer surface having a recess receiving the protrusion of the support; and an illumination assembly provided within the support and above the recess on the outer surface of the wall, wherein an outer circumferential surface of the support is formed as an inclined surface that is tilted inward from a top of the support adjacent to a circumferential edge of top plate to a bottom of the support such that liquid from the top plate flows downward along the inclined surface of the support and the liquid guide to the discharge hole of the liquid guide, wherein the liquid guide includes an outer guide wall least partially protruding upward and outward from the tank at the upper opening, and wherein the illumination assembly is positioned around the pipe.

* * * * *